United States Patent [19]

Takeo

[11] Patent Number: 4,992,663
[45] Date of Patent: Feb. 12, 1991

[54] METHOD OF JUDGING THE CORRECTNESS OR INCORRECTNESS OF A PROSPECTIVE CONTOUR POINT OF AN IRRADIATION FIELD

[75] Inventor: Hideya Takeo, Kanagawa, Japan

[73] Assignee: Fuji Photo Film Co., Ltd., Kanagawa, Japan

[21] Appl. No.: 324,879

[22] Filed: Mar. 17, 1989

[30] Foreign Application Priority Data

Mar. 19, 1988 [JP] Japan .................................. 63-66737
Jul. 26, 1988 [JP] Japan ................................ 63-186084

[51] Int. Cl.$^5$ ......................... H04N 5/30; G03B 42/00
[52] U.S. Cl. .............................. 250/327.2; 250/484.1; 364/413.13
[58] Field of Search ................. 250/327.2 G, 327.2 C, 250/484.1 B; 382/48, 22; 364/413.13

[56] References Cited

U.S. PATENT DOCUMENTS 4,644,583 2/1987 Watanabe et al. ..................... 382/22

FOREIGN PATENT DOCUMENTS 0170270 of 0000 European Pat. Off. .

OTHER PUBLICATIONS

Pratt, W. *Digital Image Processing*, John Wiley & Sons (1978) p. 525.
Journal of Nuclear Medicine, vol. 26, No. 12, Dec. 1985, pp. 1472–1477, New York, U.S.; K. Homma et al.
Systems–Computers–Controls, vol. 12, No. 4, Jul./Aug. 1981, pp. 10–18 Scripta Publishing Co., Silver Spring, Maryland, U.S.; K. Homma et al.

Primary Examiner—Jack I. Berman
Assistant Examiner—Richard Hanig
Attorney, Agent, or Firm—Sughrue, Mion, Zinn, Macpeak & Seas

[57] ABSTRACT

An image signal representing a radiation image is detected from a recording medium which has been exposed to radiation over a limited irradiation field in order to record the radiation image thereon. From the image signal, a prospective contour point, which is considered to be present on a contour of the irradiation field, is detected. A method for judging the correctness or incorrectness of a prospective contour point of an irradiation field comprises the steps of investigating whether the prospective contour point, which has been detected, satisfies or does not satisfy a predetermined judgment standard, and judging that the detected prospective contour point is incorrect and is not present on the contour of the irradiation field in cases where the detected prospective contour point does not satisfy the predetermined judgment standard.

18 Claims, 11 Drawing Sheets

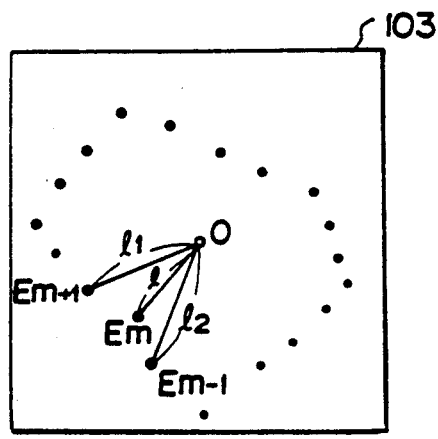
F I G. 13
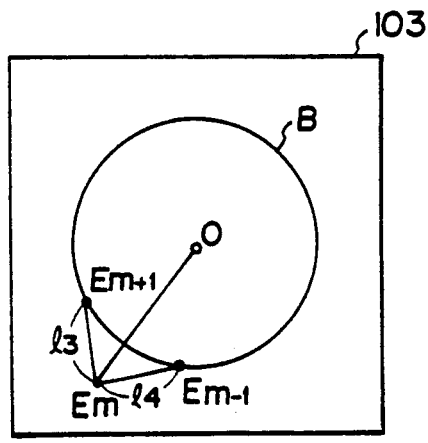
F I G. 16
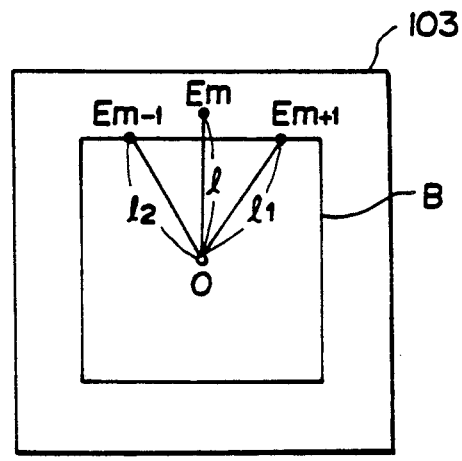
F I G. 14
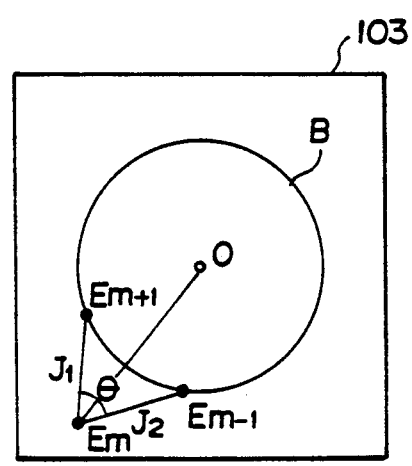
F I G. 17
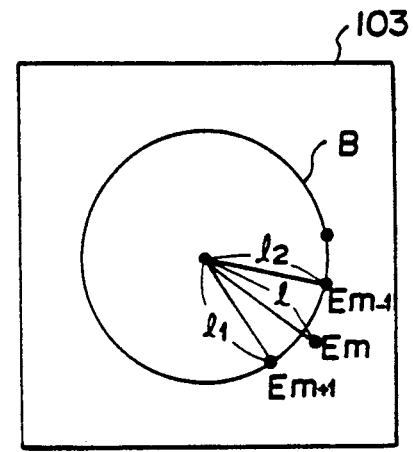
F I G. 15
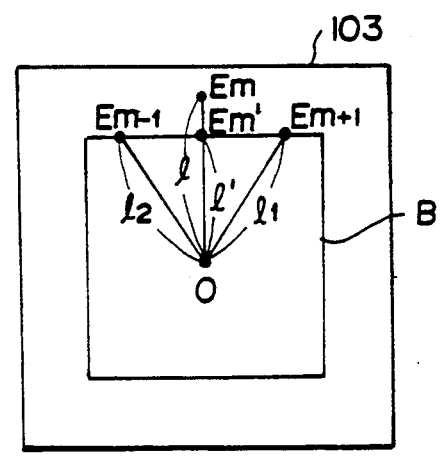
F I G. 19

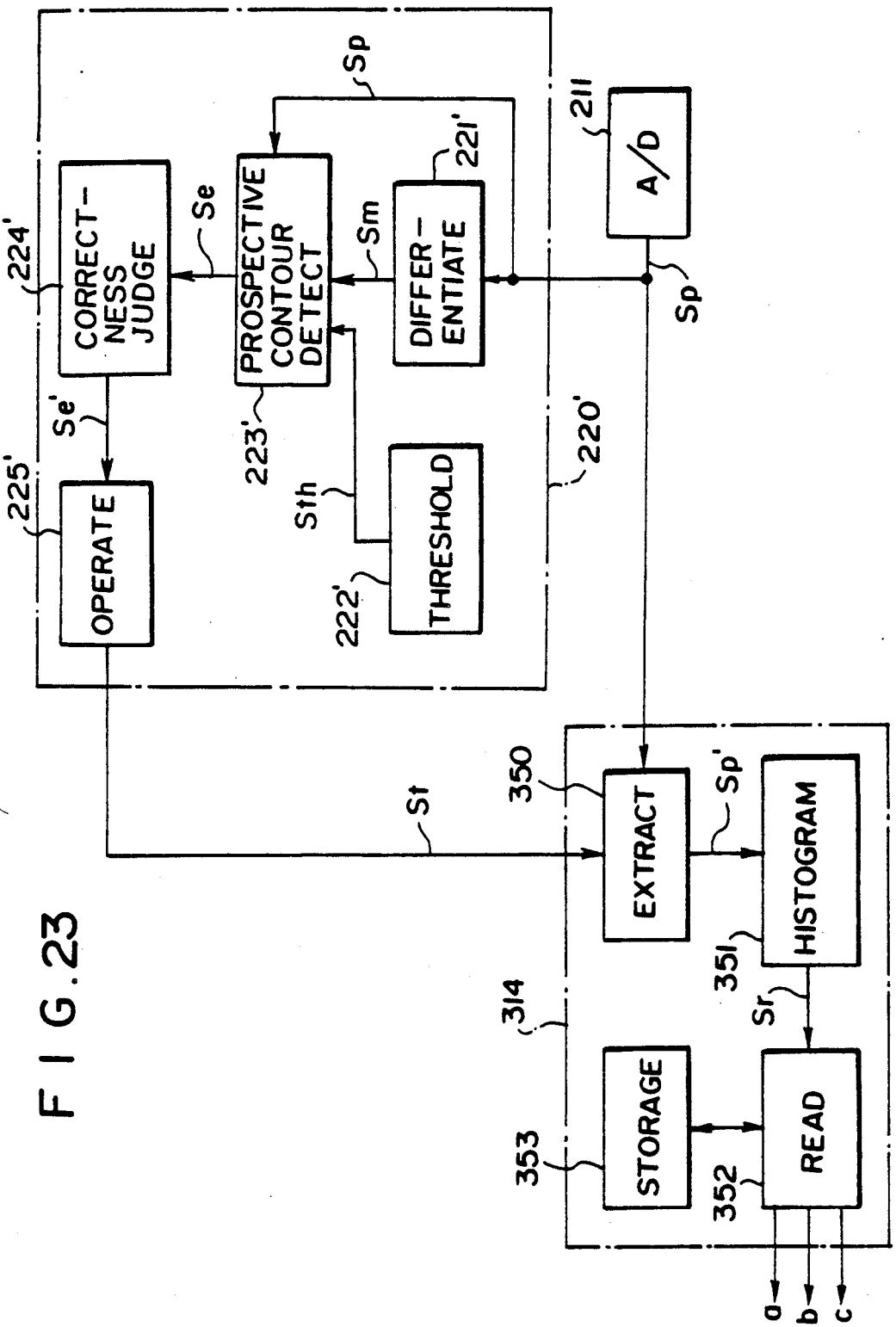

METHOD OF JUDGING THE CORRECTNESS OR INCORRECTNESS OF A PROSPECTIVE CONTOUR POINT OF AN IRRADIATION FIELD

BACKGROUND OF THE INVENTION

1. Field of the Invention

This invention relates to a method for judging the correctness or incorrectness of a prospective contour point, which has been detected as being present on a contour of an irradiation field on a recording medium, in order to recognize where an irradiation field lies on a recording medium in the course of reading out a radiation image which has been recorded on the recording medium such as a stimulable phosphor sheet.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value designed for the type of image processing to be carried out, the X-ray image is read out from the X-ray film and converted into an electric signal, and the electric signal (image signal) is image-processed and then used when the X-ray image is reproduced as a visible image on a copy photograph or the like. In this manner, a visible image having good image quality and exhibiting such characteristics as high contrast, high sharpness, high graininess or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, which is used when the radiation image of the object is reproduced as a visible image on a recording material such as photographic film, a display device such as a cathode ray tube (CRT), or the like.

A radiation image recording and reproducing system using a stimulable phosphor sheet is advantageous over conventional radiography using silver halide in that the amount of light emitted by the stimulable phosphor sheet is proportional to the energy intensity of the radiation, to which the stimulable phosphor sheet is exposed when an image is recorded thereon, and the energy intensity of said radiation may be selected from a very wide range (latitude) of radiation energy intensities. If an appropriate read-out gain is selected and used when the light emitted by said stimulable phosphor sheet is being detected, a desirable density can be obtained in the finally reproduced visible image regardless of the energy intensity of the radiation to which the stimulable phosphor sheet was exposed.

In order to detect an image signal accurately, certain factors which affect the image signal must be set in accordance with the dose of radiation delivered to the stimulable phosphor sheet and the like. A novel radiation image recording and reproducing system which accurately detects an image signal has been proposed in, for example, U.S. Pat. No. 4,527,060. The proposed radiation image recording and reproducing system is constituted such that a preliminary read out operation (hereinafter simply called "preliminary read out") is carried out for approximately ascertaining the radiation image stored on the stimulable phosphor sheet. In the preliminary read out the stimulable phosphor sheet is scanned with a light beam having a comparatively low energy level, and a preliminary read-out image signal obtained during the preliminary read out is analyzed. Thereafter, a final read out operation (hereinafter simply called "final read out") is carried out for obtaining the image signal, which is to be used during the reproduction of a visible image. In the final read out the stimulable phosphor sheet is scanned sheet with a light beam having an energy level higher than the energy level of the light beam used in the preliminary read out, and the radiation image is read out with the factors affecting the image signal adjusted to appropriate values on the basis of the results of an analysis of the preliminary read-out image signal.

The term "read-out conditions" as used hereinafter means generically various factors, which are adjustable and which affect the relationship between the amount of light emitted by the stimulable phosphor sheet during image read out and the output of a read-out means, i.e. the shape of the image signal. For example, the term "read-out conditions" includes the value of the read-out gain and scale factor which define the relationship between the input to the read-out means and the output therefrom. The term might also include the power of the stimulating rays used for image read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the exposing light beam, i.e. the sensitivity of the phosphor sheet to the exposing light beam depends upon the wavelength of the exposing light beam, the term "energy level of a light beam" means that the energy level of the light beam, to which the stimulable phosphor sheet is exposed per unit area, is weighted with the sensitivity of the phosphor sheet to the wavelength of the exposing light beam. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed with which the stimulable phosphor sheet is scanned with the light beam may be changed.

Regardless of whether the preliminary read out is or is not carried out, it has also been proposed to analyze the image signal (including the preliminary read-out image signal) obtained and to adjust an image processing condition, which is used when the image signal is processed, on the basis of the results of the analysis of the image signal. The proposed method is applicable to cases where an image signal is obtained from a radiation image recorded on a recording medium such as conventional X-ray film, as well as to the systems using stimulable phosphor sheets.

Various methods have been proposed for calculating how the read-out conditions for final read out and/or the image processing condition should be adjusted on the basis of an analysis of the image signal (including the preliminary read-out image signal). As one of such methods, it has been proposed in, for example, U.S. Pat. No. 4,682,028 to create a histogram of the image signal. When a histogram of the image signal is created, the characteristics of a radiation image recorded on a recording medium such as a stimulable phosphor sheet or an X-ray film can be ascertained based on, for example, the maximum value of the image signal, the minimum value of the image signal, or the value of the image signal at which the histogram is maximum, i.e. the value which occurs most frequently. Therefore, if the read-out conditions for the final read out, such as the read-out gain or the scale factor, and/or the image processing condition such as the gradation processing condition or the frequency response processing condition are based on an analysis of the histogram of the image signal, it becomes possible to reproduce a visible image suitable for viewing, particularly for diagnostic purposes.

On the other hand, in the course of radiation image recording, it is often desirable for portions of the object not related to a diagnosis or the like to be prevented from being exposed to radiation. Further, when the object portions not related to a diagnosis or the like are exposed to radiation, the radiation is scattered by such portions to the portion that is related to a diagnosis or the like, and the contrast and resolution are adversely affected by the scattered radiation. Therefore, when a radiation image is recorded on the recording medium, an irradiation field stop is often used for limiting the irradiation field to an area smaller than the overall recording region of the recording medium so that radiation is irradiated only to that portion of the object which is to be viewed.

However, in cases where the read-out conditions for the final read out and/or an image processing condition are calculated on the basis of the results of an analysis of the image signal in the manner described above and the image signal is detected from a recording medium, on which a radiation image has been recorded by limiting the irradiation field, the radiation image cannot be ascertained accurately if the image signal is analyzed without taking the shape and location of the irradiation field into consideration. As a result, incorrect read-out conditions and/or an incorrect image processing condition is set, so that a visible radiation image suitable for viewing, particularly for diagnostic purposes, cannot be reproduced.

In order to eliminate the aforesaid problem, it is necessary to recognize the shape and location of an irradiation field and then to calculate the read-out conditions for the final read out and/or an image processing condition on the basis of the image signal representing image information stored in the region inside of the irradiation field.

The applicant has proposed various methods for recognizing an irradiation field as disclosed in, for example, U.S. patent application Ser. No. 760,862. The proposed methods allow the aforesaid problem to be eliminated by recognizing where the irradiation field lies on the recording medium, and calculating the readout conditions for the final read out and/or an image processing condition on the basis of only an image signal corresponding to the region thus recognized.

In general, in the disclosed methods for recognizing an irradiation field, several points which are considered to be present on a contour of the irradiation field, i.e. several prospective contour points, are detected Thereafter, the straight lines or curves connecting the prospective contour points are detected, and the region surrounded by the straight lines or curves is recognized as the irradiation field.

A novel method for detecting a prospective contour point has been proposed in, for example, U.S. patent application Ser. No. 760,862. The proposed method comprises the steps of reading out a radiation image which has been recorded on a recording medium in order to obtain an image signal, sampling and digitizing the image signal so that a digital image signal component represents the image information at each position of a predetermined number of positions on the recording medium, and carrying out differentiation processing of the digital image signal components representing image information stored at positions located along a single line on the recording medium. Points at which the absolute value of the differentiated values obtained during the differentiation processing exceed a predetermined threshold value are detected as prospective contour points. In cases where several such points are present, the point nearest to an edge of the recording medium is detected as a prospective contour point. Further, another method of recognizing the irradiation field has been proposed in copending U.S. patent application Ser. No. 182,685. In the proposed method, the irradiation field is recognized by obtaining digital image data for a plurality of positions on the stimulable phosphor sheet from the image signals, detecting prospective edge points, which are considered to be edge portions of the irradiation field on the stimulable phosphor sheet, on the basis of the image data of positions radially outwardly arranged in a plurality of directions from a predetermined point inside the irradiation field, and recognizing as the irradiation field the region surrounded by the lines passing through the prospective edge points. Alternatively, a prospective contour point may be detected by, for example, a method utilizing pattern matching, or a method wherein a straight line is applied and the contour of an irradiation field is discriminated from an inclination of the straight line.

However, in cases where the portion of an image, such as the image of the edge of a bone, at which the image density changes sharply as it also does at the contour of an irradiation field, is present in a radiation image, or energy from scattered radiation has been stored in the region outside of an irradiation field on a recording medium, a prospective contour point is often detected incorrectly. It is difficult to completely eliminate the incorrect detection of a prospective contour point. However, if it were possible to determine that a prospective contour point had been detected incorrectly, said prospective contour point could be canceled, or a correction could be made so that a prospective contour point detected by a different method were employed, instead of said prospective contour point detected incorrectly. In this manner, an irradiation field could be prevented from being recognized incorrectly.

SUMMARY OF THE INVENTION

The primary object of the present invention is to provide a method which accurately judges whether a prospective contour point of an irradiation field, which point has been detected, is or is not correct.

Another object of the present invention is to provide a method for judging the correctness or incorrectness of a prospective contour point of an irradiation field, which enables a visible radiation image suitable for viewing, particularly for diagnostic purposes to be reproduced.

The present invention provides, in a method for detecting an image signal representing a radiation image from a recording medium which has been exposed to radiation over a limited irradiation field in order to record the radiation image thereon, and detecting a prospective contour point, which is considered to be present on a contour of the irradiation field, from the image signal, a first method for judging the correctness or incorrectness of a prospective contour point of an irradiation field, which comprises the steps of:

(i) investigating whether a prospective contour point, which has been detected, satisfies or does not satisfy a predetermined judgment standard, and (ii) in cases where said detected prospective contour point does not satisfy the predetermined judgment standard, judging that said detected prospective contour point is incorrect and is not present on a portion of an irradiation field.

The present invention also provides, in a method for detecting an image signal representing a radiation image from a recording medium which has been exposed to radiation by limiting an irradiation field in order to record the radiation image thereon, and detecting a prospective contour point, which is considered to be present at a contour portion of the irradiation field, from the image signal, a second method for judging the correctness or incorrectness of a prospective contour point of an irradiation field, which comprises the steps of:

(i) investigating whether a prospective contour point, which has been detected, satisfies or does not satisfy a predetermined judgment standard, (ii) calculating the mean image density in the region extending from said detected prospective contour point to a point, which is assumed to be present on a contour of an irradiation field from the positions of other prospective contour points, and (iii) in cases where said detected prospective contour point does not satisfy the predetermined judgment standard and, at the same time, the mean image density is lower than a predetermined threshold value, judging that said detected prospective contour point is incorrect and is not present on the contour of the irradiation field.

The judgment standard may be, for example, the relationship between the distance from a prospective contour point, which is subjected to judgment, to a predetermined point inside of an image and distances from other prospective contour points to said predetermined point. Alternatively, the judgment standard may be the relationship between the distances from a prospective contour point, which is subjected to judgment, to other prospective contour points and a predetermined threshold value. The judgment standard may also be the relationship between an angle, which is made between two straight lines connecting a prospective contour point, which is subjected to judgment, to two other prospective contour points and a predetermined threshold value.

The first and second methods for judging the correctness or incorrectness of a prospective contour point of an irradiation field in accordance with the present invention investigate whether a prospective contour point, which has been detected by a method using differentiation processing or the like, is or is not correct. Also, the second method for judging the correctness or incorrectness of a prospective contour point of an irradiation field in accordance with the present invention calculates the mean image density in a region extending from the prospective contour point, which has been detected, to a point which is assumed to be present on a contour of an irradiation field from the positions of other prospective contour points, and investigates whether the prospective contour point, which has been detected, is or is not present in a region outside of the irradiation field. Therefore, with the first and second methods for judging the correctness or incorrectness of a prospective contour point of an irradiation field in accordance with the present invention, the correctness or incorrectness of a prospective contour point can be judged accurately, and it is possible to prevent an incorrect prospective contour point from being used to recognize the shape and location of an irradiation field. Accordingly, information about an object can be ascertained accurately because the irradiation field is accurately recognized, and the read-out conditions for the final read out can be adjusted to appropriate values. An appropriate type of image processing can also be carried out. As a result, it is possible to reproduce a visible radiation image suitable for viewing, particularly for diagnostic purposes.

The present invention further provides, in a method for detecting prospective contour points which comprises the steps of, in cases where, in order to record a radiation image thereon, a rectangular recording medium has been exposed to radiation over a limited irradiation field having a rectangular shape so that two portions of the contour of the irradiation field are approximately parallel to each other and spaced at approximately equal distances from two opposite sides of the recording medium:

(i) detecting an image signal representing said radiation image from said recording medium, (ii) sampling and digitizing the image signal to obtain digital image signal components representing image information stored at respective positions on said recording medium, (iii) carrying out differentiation processing on the digital image signal components representing image information stored at positions of the recording medium located along a single line which intersects said two opposite sides of said recording medium at right angles, and (iv) based on differentiated values obtained from the differentiation processing, detecting two prospective contour points each of which is considered to be present at each of two said contour portions, a third method for judging the correctness or incorrectness of a prospective contour point of an irradiation field, which comprises the steps of:

(a) investigating whether the relationships expressed as $$|l_1 - l_2| < \alpha, \quad l_3 > \beta$$

are or are not satisfied, where l1 denotes the distance from one of said two opposite sides of said recording medium to the detected prospective contour point, which is nearer to said one of said two opposite sides of said recording medium than the other of two said detected prospective contour points, 12 denotes the distance from the other of said two opposite sides of said recording medium to the detected prospective contour point, which is nearer to said other of said two opposite sides of said recording medium than the other of two said detected prospective contour points, 13 denotes the distance between two said detected prospective contour points, and $\alpha$ and $\beta$ each denote a predetermined threshold value, and (b) in cases where at least one of said relationships is not satisfied, judging that two said detected prospective contour points are incorrect and are not present on the contour of the irradiation field.

In cases where a radiation image has been recorded on a rectangular recording medium over a limited irradiation field having a rectangular shape so that two contour portions of the irradiation field are approximately parallel to each other and spaced at approximately equal distances from two opposite sides of the recording medium, two prospective contour points detected on a single line of the recording medium must be spaced approximately equal distances from the sides of the recording medium. Therefore, when the relationship expressed as $$|l_1 - l_2| < \alpha$$

is not satisfied, i.e. when the distances l1 and l2 are much different from each other, it is recognized that at least one of the two detected prospective contour points is incorrect.

On the other hand, the image of an edge of a bone or the like in a radiation image is often detected as a prospective contour point. In such cases, the relationship expressed as $$|l_1 - l_2| < \alpha$$

is often satisfied. However, in such cases, the distance between two detected prospective contour points is shorter than the distance between two correct prospective contour points. Therefore, when the relationship expressed as $$l_3 > \beta$$

is not satisfied, it is recognized that the two detected prospective contour points are incorrect.

The third method for judging the correctness or incorrectness of a prospective contour point of an irradiation field in accordance with the present invention investigates whether a pair of prospective contour points detected by a method using differentiation processing are or are not present at approximately equal distances from two opposite sides of a rectangular recording medium, and are or are not too close to each other. Therefore, the third method for judging the correctness or incorrectness of a prospective contour point of an irradiation field in accordance with the present invention can accurately judge whether prospective contour points, which have been detected for a rectangular irradiation field limited so that its center line coincides with the center line of the rectangular recording medium, are or are not correct. Accordingly, with the third method for judging the correctness or incorrectness of a prospective contour point of an irradiation field in accordance with the present invention, the same effects as with the first and second methods for judging the correctness or incorrectness of a prospective contour point of an irradiation field in accordance with the present invention can be achieved.

BRIEF DESCRIPTION OF THE DRAWINGS

FIGS. 13, 14, 15, 16 and 17 are explanatory views showing judgment standards used in the first method for judging the correctness or incorrectness of a prospective contour point of an irradiation field in accordance with the present invention, FIG. 19 is an explanatory view showing the mean image density calculated and used in the second method for judging the correctness or incorrectness of a prospective contour point of an irradiation field in accordance with the present invention, FIG. 23 is a block diagram showing part of the radiation image recording and reproducing system shown in FIG. 1, wherein an embodiment of the third method for judging the correctness or incorrectness of a prospective contour point of an irradiation field in accordance with the present invention is employed.

DESCRIPTION OF THE PREFERRED EMBODIMENTS

The present invention will hereinbelow be described in further detail with reference to the accompanying drawings.

Figure 1:
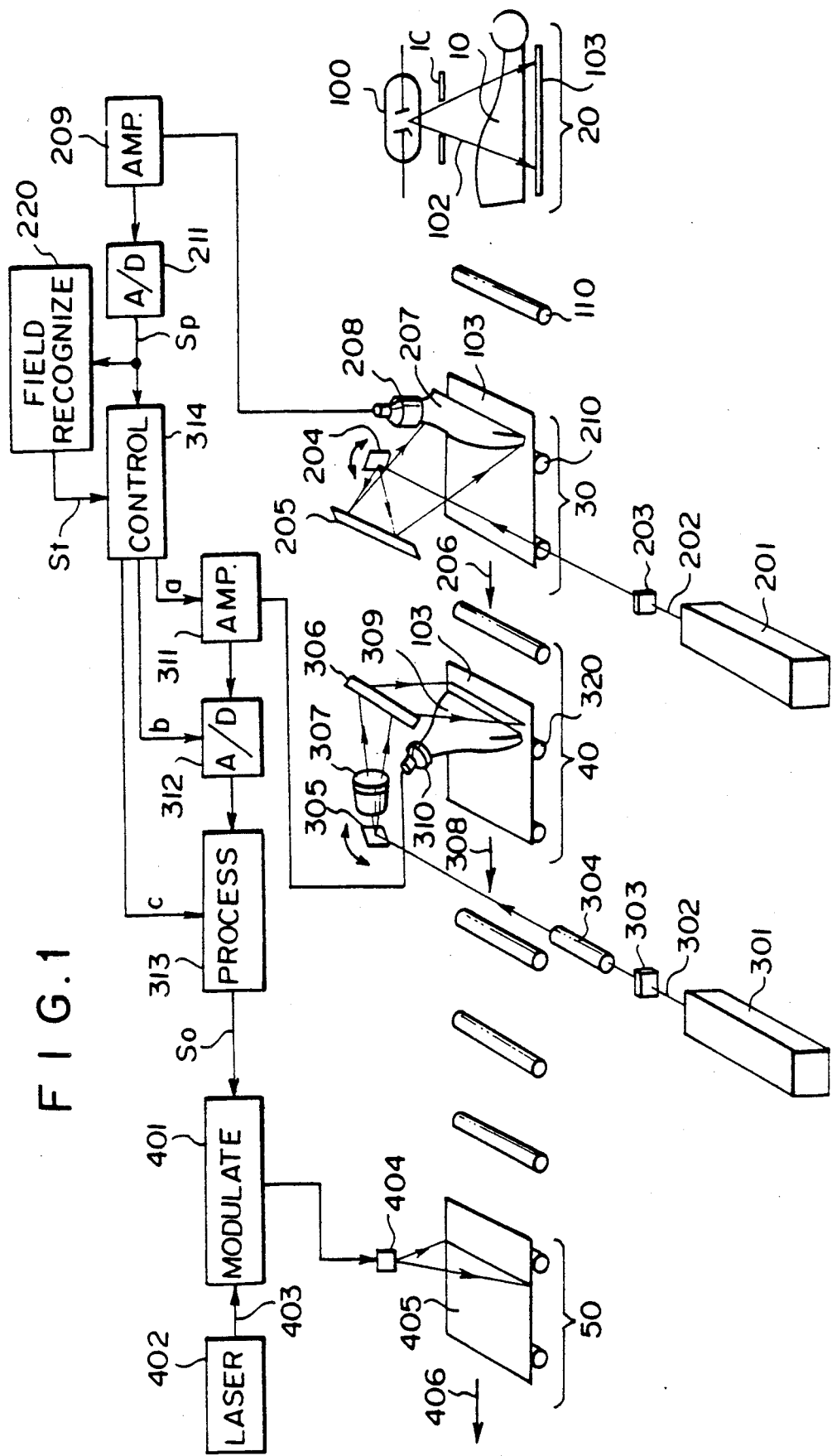
FIG. 1 is a schematic view showing a radiation image recording and reproducing system wherein an embodiment of the first method for judging the correctness or incorrectness of a prospective contour point of an irradiation field in accordance with the present invention is employed.

With reference to FIG. 1, a radiation image recording and reproducing system wherein an embodiment of the first method for judging the correctness or incorrectness of a prospective contour point of an irradiation field in accordance with the present invention is employed comprises basically a radiation image recording section 20, a preliminary read-out section 30, a final read-out section 40, and an image reproducing section 50. In the radiation image recording section 20, radiation 102 is emitted toward an object 101 by a radiation source 100 constituted of an X-ray tube or the like. A stimulable phosphor sheet 103 for storing radiation energy thereon is placed at a position where it is exposed to the radiation 102 which has passed through the object 101, and a radiation image of the object 101 is stored on the stimulable phosphor sheet 103. An irradiation field stop 104 for limiting the irradiation field of the radiation 102 is disposed between the radiation source 100 and the object 101.

The stimulable phosphor sheet 103 carrying the radiation image of the object 101 stored thereon is sent to the preliminary read-out section 30 by a sheet conveyance means 110 constituted of a conveyor roller or the like. At the preliminary read-out section 30, a laser beam 202 emanating from a laser beam source 201 first passes through a filter 203 which filters out light having wavelengths within the range of wavelengths of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emanating therefrom has a wavelength distribution different from and far apart from the wavelength distribution of the light emitted by the stimulable phosphor sheet 103 when it is stimulated. While the laser beam 202 impinges upon the stimulable phosphor sheet 103, the stimulable phosphor sheet 103 is moved in the direction indicated by the arrow 206 (i.e. in the sub-scanning direction) by a sheet conveyance means 210 constituted of conveyor rollers or the like and thus the overall surface of the stimulable phosphor sheet 103 is exposed to and scanned by the laser beam 202. The power of the laser beam source 201, the beam diameter of the laser beam 202, the speed with which the laser beam 202 scans, and the speed at which the stimulable phosphor sheet 103 moves are selected so that the level of the stimulation energy of the laser beam 202 used during the preliminary read-out is lower than the level of the stimulation energy of the laser beam used during the final read-out carried out in the final read-out section 40.

When it is exposed to the laser beam 202 as described above, the stimulable phosphor sheet 103 emits light in an amount proportional to the amount of energy stored thereon during exposure to the radiation, and the emitted light enters a light guide member 207 which may be of the shape and material disclosed in U.S. Pat. No. 4,346,295. The light is guided inside of the light guide member 207 through total reflection, emanates from a light output face of the light guide member 207 and is received by a photodetector 208 constituted of a photomultiplier or the like. The light receiving face of the photodetector 208 is positioned so that it is close contact with a filter which transmits only light having wavelengths within the range of wavelengths of light emitted by the stimulable phosphor sheet 103 and filters out light having wavelengths within the range of wavelengths of the stimulating rays, so that the photodetector 208 detects only the light emitted by the stimulable phosphor sheet 103 upon stimulation thereof. The light detected by the photodetector 208 is converted into an electric signal carrying the image input information stored on the stimulable phosphor sheet 103, and amplified by an amplifier 209. The signal generated by the amplifier 209 is digitized by an A/D converter 211, and sent as a preliminary read-out image signal Sp to a final read-out control circuit 314 in the final read-out section 40. On the basis of the image input information which the preliminary read-out image signal Sp represents, the final read-out control circuit 314 calculates a read-out gain setting value (a), a scale factor setting value (b), and a reproduced image processing condition setting value (c). The preliminary read-out image signal Sp is also sent to an irradiation field recognition circuit 220 which will be described in detail later.

After the preliminary read-out from the stimulable phosphor sheet 103 is finished, the stimulable phosphor sheet 103 is sent to the final read-out section 40. In this section, a laser beam 302 emanating from a laser beam source 301 first passes through a filter 303 which filters out light having wavelengths within the range of the wavelengths of light emitted by the stimulable phosphor sheet 103 upon stimulation thereof by the laser beam 302. Then, the beam diameter of the laser beam 302 is precisely adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 an $f\theta$ lens 307 is disposed for keeping the beam diameter of the laser beam 302 uniform as it scans the stimulable phosphor sheet 103. While the laser beam 302 impinges upon the stimulable phosphor sheet 103, the stimulable phosphor sheet 103 is moved in the direction indicated by the arrow 308 (i.e. in the sub-scanning direction) by a sheet conveyance means 320 constituted of conveyor rollers or the like and, consequently, the overall area of the stimulable phosphor sheet 103 is exposed to and scanned by the laser beam 302. Upon exposure to the laser beam 302, the stimulable phosphor sheet 103 emits light in proportion to the amount of energy stored thereon during exposure to radiation, and the light emitted enters a light guide member 309 which is made of the same material and has the same configuration as the light guide member 207 used for the preliminary read-out. The light emitted by the stimulable phosphor sheet 103 is guided inside of the light guide member 309 through repeated total reflection, emanates from the light output face of the light guide member 309 and is received by a photodetector 310 constituted of a photomultiplier or the like. The light receiving face of the photodetector 310 is positioned in close contact with a filter which selectively transmits only the light having wavelengths within the range of wavelengths of light emitted by the stimulable phosphor sheet 103, so that the photodetector 310 detects only the light emitted thereby.

The output of the photodetector 310, which photoelectrically detects the light emission representing the radiation image stored on the stimulable phosphor sheet 103, is amplified to an appropriate level by an amplifier 311. The gain of the amplifier 311 is adjusted on the basis of the read-out gain setting value (a) calculated by the control circuit 314. The amplified electric signal is fed into an A/D converter 312 which converts the electric signal into a digital signal by use of a scale factor which is adjusted by the scale factor setting value (b) to suit the width in the fluctuation of the values of the signal. The digital signal thus obtained is fed into a signal processing circuit 313, in which it is subjected to signal processing (image processing), the nature of which signal processing is based on the reproduced image processing condition setting value (c). After the digital signal is processed, a visible radiation image is obtained which is suitable for viewing, particularly for diagnostic purposes.

The processed digital signal is output as a read-out image signal (a final read out image signal) So. The final read-out image signal So generated by the signal processing circuit 313 is fed into a light modulator 401 in the image reproducing section 50. In the image reproducing section 50, a laser beam 403 emanating from a reproducing laser beam source 402 is modulated by the light modulator 401 on the basis of the final read-out image signal So received from the signal processing circuit 313, and is made to impinge upon a photosensitive material 405 such as photographic film by a scanning mirror 404 which causes the laser beam 403 to scan the photosensitive material 405. At this time, the photosensitive material 405 is moved in a direction normal to the aforesaid scanning direction, i.e. in the direction indicated by the arrow 406. Accordingly, the radiation image represented by the final read-out image signal So is recorded on the photosensitive material 405. To reproduce the radiation image, it is possible to use any other appropriate method such as the aforesaid method using a CRT display unit.

Figure 2:
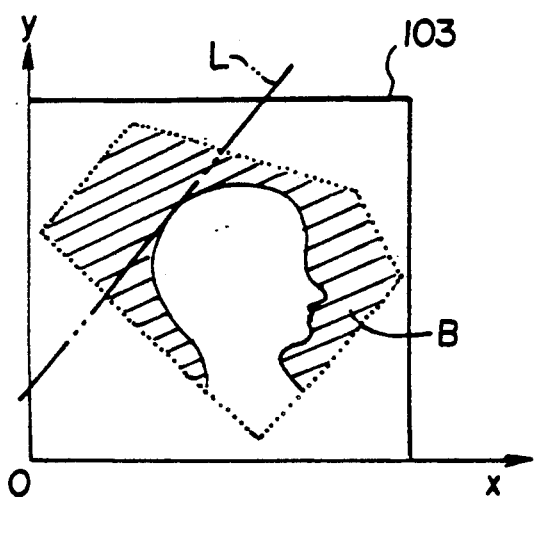
FIG. 2 is an explanatory view showing the state of a radiation image stored on a stimulable phosphor sheet in the first method for judging the correctness or incorrectness of a prospective contour point of an irradiation field in accordance with the present invention.
Figure 5:
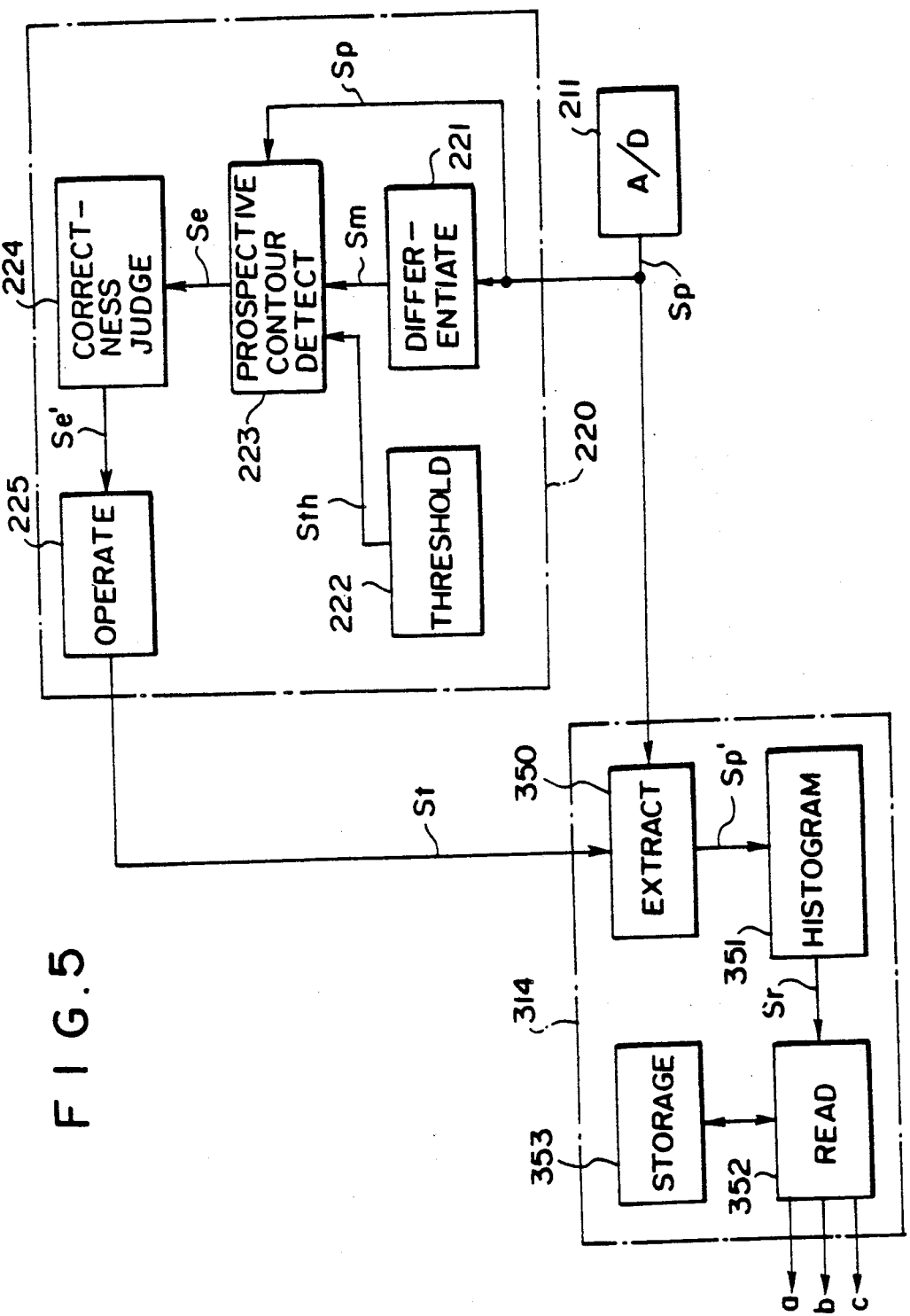
FIG. 5 is a block diagram showing part of the radiation image recording and reproducing system shown in FIG. 1.

A technique for accurately adjusting the read-out gain setting value (a), the scale factor setting value (b) and the image processing condition setting value (c) when the irradiation field B on the stimulable phosphor sheet 103 is limited as shown in FIG. 2 will hereinbelow be described with reference to FIG. 5. As shown in FIG. 5, the control circuit 314 comprises a signal extracting section 350, a histogram analysis section 351, a read section 352, and a storage section 353. The aforesaid preliminary read-out image signal Sp is fed into the signal extracting section 350 which extracts a preliminary read-out image signal Sp' only within a specified region as will be described later. The preliminary read-out image signal Sp' is sent from the signal extracting section 350 to the histogram analysis section 351. The histogram analysis section 351 creates a histogram of the preliminary read-out image signal Sp', calculates the maximum value of the signal, the minimum value of the signal, the signal value which occurs most often, i.e. the signal value corresponding to the maximum value of the histogram, or the like, and feeds a signal Sr representing the calculated value into the read section 352. The storage section 353 stores the read-out gain setting value (a), the scale factor setting value (b), and the image processing condition setting value (c) suitable for the aforesaid maximum value, minimum value, signal value which occurs most often, or the like. The read section 352 reads the setting values (a), (b) and (c) suitable for the signal Sr from the storage section 353, and feeds them respectively into the amplifier 311, the A/D converter 312, and the signal processing circuit 313.

Figure 4A:
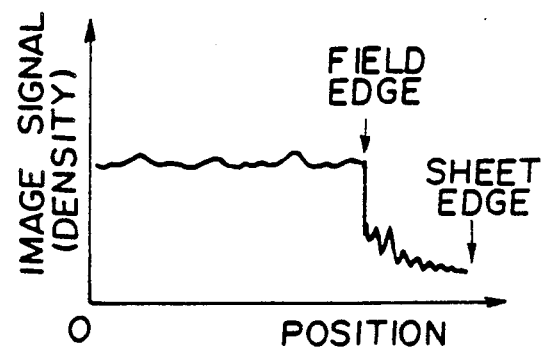
FIG. 4A is a graph showing the distribution of image signal components in the first method for judging the correctness or incorrectness of a prospective contour point of an irradiation field in accordance with the present invention.
Figure 3:
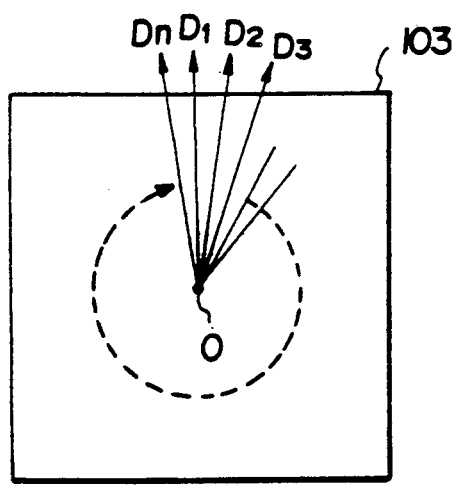
FIG. 3 is an explanatory view showing how differentiation processing can be carried out in the first method for judging the correctness or incorrectness of a prospective contour point of an irradiation field in accordance with the present invention.
Figure 4B:
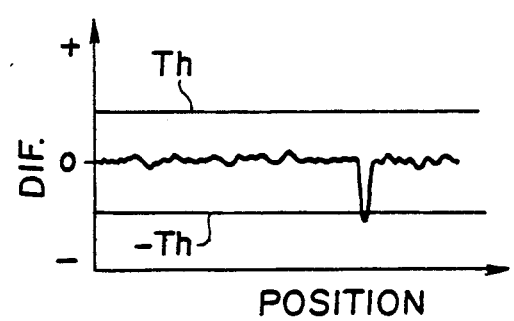
FIG. 4B is a graph showing the distribution of the difference values calculated from neighboring image signal components in the first method for judging the correctness or incorrectness of a prospective contour point of an irradiation field in accordance with the present invention.

How the signal extracting section 350 extracts a signal will now be described below. The irradiation field recognizing circuit 220 is composed of a differentiation processing section 221, a threshold value adjusting section 222, a prospective contour point signal detecting section 223, a correctness or incorrectness judging section 224, and an operating section 225. The preliminary read-out image signal Sp is fed into the differentiation processing section 221 and the prospective contour point signal detecting section 223. The differentiation processing section 221 differentiates the components of the preliminary read-out image signal Sp corresponding to positions on the stimulable phosphor sheet 103 located along a line in the direction of D1, then along lines in the directions D2, D3, ..., Dn shown in FIG. 3. Differentiation processing may be of the one-dimensional type of first or higher order, or may be of the two-dimensional type of first or higher order. In cases of a discretely sampled image, differentiation is equivalent to calculation of the difference between the values of neighboring image signal components. In this embodiment, the difference in the values of neighboring image signal components is calculated. Lines along the directions D1 through Dn radiate from the center O of the stimulable phosphor sheet 103 toward the edges thereof. In this embodiment, lines along the directions D1 through Dn radiate at equal angle intervals. For example, if the size of the stimulable phosphor sheet 103 is 256 mm×192 mm, approximately 64 directions are selected as the directions D1 through Dn. Differentiation processing is carried out, and the differences among image signal components of the preliminary read-out image signal Sp corresponding to adjacent positions on the stimulable phosphor sheet are calculated. A signal Sm representing the differences is stored in the memory 222, and fed into the threshold value adjusting section 223. Based on the signal Sm representing the differences and a signal Sth which is received from the threshold value adjusting section 222 and which represents a threshold value Th, the prospective contour point signal detecting section 223 detects a prospective contour point which is considered to be present on a contour of the irradiation field B on the stimulable phosphor sheet 103. Specifically, the levels of the image signal components of the preliminary read-out image signal Sp for the region inside of the irradiation field B are distinctly higher than those for the region outside of the irradiation field B. Therefore, the values of the image signal components of the preliminary read-out image signal Sp corresponding to positions on the stimulable phosphor sheet located along a line in a certain direction Di are distributed as shown in FIG. 4A. Accordingly, as shown in FIG. 4B, the values of the aforesaid differences change markedly at an edge of an irradiation field. The prospective contour point signal detecting section 223 detects a point, at which the difference has a negative sign and the absolute value of which difference exceeds the threshold value Th, as a prospective contour point.

Thereafter, the prospective contour point signal detecting section 223 extracts image signal components at prospective contour points, which have been detected in the manner described above, from the preliminary read-out image signal Sp. The prospective contour point signal detecting section 223 finds the positions of picture elements, respectively corresponding to the extracted image signal components, and feeds a signal Se representing the positions of the picture elements into the correctness or incorrectness judging section 224. Most of the image signal components extracted from the preliminary read-out image signal Sp constitute an image signal, which represents the contour of the irradiation field B on the stimulable phosphor sheet 103 as shown in FIG. 2. In this embodiment, as shown in FIG. 2, the positions of the picture elements are expressed on an x-y orthogonal coordinate system on the stimulable phosphor sheet 103.

Hereinafter, the term "directions of differentiation processing" means the directions of the lines along which positions on the stimulable phosphor sheet lie, the image signal components representing the image information at said positions undergoing differentiation processing starting with the image signal components representing image information at positions at one end of the line.

The correctness or incorrectness judging section 224 judges whether the prospective contour points at the positions of the picture elements which are represented by the signal Se are or are not truly present on a contour of the irradiation field. Specifically, with reference to FIG. 13, Em denotes a prospective contour point which is to be subjected to judgment, and Em+1 and Em−1 denote prospective contour points which are present beside the prospective contour point which is to be subjected to judgment. The correctness or incorrectness judging section 224 investigates whether the distance l from the center point O of the stimulable phosphor sheet 103 to the prospective contour point Em, the distance l1 from the center point O to the prospective contour point Em+1, and the distance l2 from the center point O to the prospective contour point Em−1 satisfy or do not satisfy the relationship expressed as $$l \geqq \frac{l_1 + l_2}{2} \cdot \cos \frac{2\pi}{n} \quad (1)$$

where n denotes the number of directions of differentiation processing. As in ordinary circumstances, the irradiation field B in this embodiment has a polygonal shape free of any concave-like regions such as those in a star-shaped polygon. Also, the irradiation field B is limited so that the center point O of the stimulable phosphor sheet 103 is positioned within the irradiation field B. Formula (1) is not satisfied when, as shown in FIG. 13, the prospective contour point Em is positioned closer to the center point O of the stimulable phosphor sheet 103 than the prospective contour points Em+1 and Em−1. However, insofar as the irradiation field B has a polygonal shape free of concave-like regions, the prospective contour point Em positioned closer to the center point O than the prospective contour points Em+1 and Em−1 cannot be present on the contour of the irradiation field B. Therefore, when the prospective contour point Em does not satisfy Formula (1), the correctness or incorrectness judging section 224 judges that the prospective contour point Em is present inside of the irradiation field B, and therefore is incorrect. The correctness or incorrectness judging section 224 eliminates the information about the picture element position of the prospective contour point Em from the picture element position signal Se. On the other hand, when the prospective contour point Em satisfies Formula (1), the information about the picture element position of the prospective contour point Em is not eliminated from the picture element position signal Se. The correctness or incorrectness judging section 224 carries out the aforesaid judgment and eliminating processes, when necessary, for all of the detected prospective contour points, and feeds a processed picture element position signal Se' to the operating section 225.

In this embodiment, when the prospective contour point Em is judged to be incorrect, the information about the picture element position of that point is canceled from the signal Se. Alternatively, a new prospective contour point may be derived from other prospective contour points. By way of example, another point on the stimulable phosphor sheet 103 which lies on a line passing through the center point O and the incorrect contour point Em and which is spaced at a distance l' expressed as $$l' = \frac{l_1 + l_2}{2} \cdot \cos\frac{2\pi}{n}$$

from the center point O of the stimulable phosphor sheet 103 may be employed as the aforesaid new prospective contour point.

After the prospective contour points are detected in the manner described above, lines connecting them may be recognized as the contour of the irradiation field B. The lines connecting the prospective contour points can be found by using one of several methods, for example, a method wherein prospective contour points remaining after a smoothing process has been carried out are connected together, a method wherein a plurality of straight lines are found by locally applying the method of least squares and the straight lines are then connected together, or a method wherein a spline curve or the like is applied. In this embodiment, the operating section 225 finds a plurality of straight lines connecting the prospective contour points by utilizing a Hough transformation. The processing done to find the straight lines will hereinbelow be described in detail.

Figure 6:
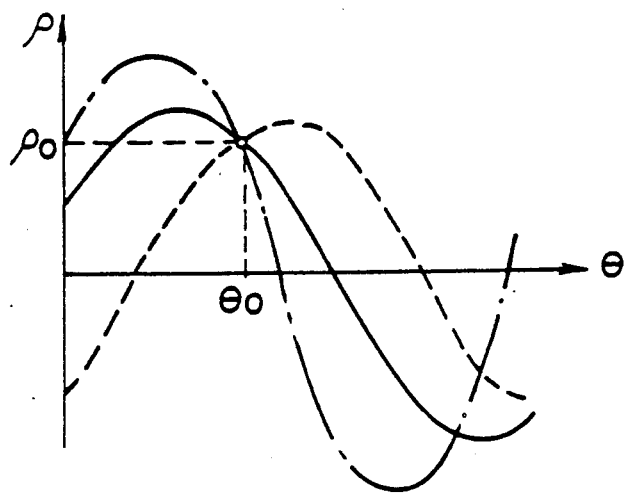
FIG. 6 is an explanatory graph showing a method for detecting straight lines which connect prospective contour points of an irradiation field.

If (xo,yo) are the coordinates of the picture element positions (the prospective contour points) which the signal Se' represents, then the operating section 225 calculates the curves expressed as $$\rho = xo \cos\theta + yo \sin\theta$$

xo and yo being constant for each prospective contour point coordinate (xo,yo). FIG. 6 shows the curves thus obtained, and the number of curves equals the number of prospective contour point coordinates (xo,yo).

Then, the operating section 225 calculates the coordinates ($\rho o, \theta o$) of the points where the curves intersect and where the number of curves intersecting at each point ($\rho o, \theta o$) is not smaller than a predetermined number Q. Because of errors in finding the prospective contour point coordinates (xo,yo), many curves rarely intersect exactly at a single point. Therefore, by way of example, in the case where multiple sets of two curves have intersections spaced from one another by only small distances not longer than a predetermined distance, the point of intersection at the middle of the group of the intersections is taken as the aforesaid intersection ($\rho o, \theta o$). Then, from each intersection ($\rho o, \theta o$), the operating section 225 calculates a straight line expressed as $$\rho o = x \cos\theta o + y \sin\theta o$$

on the x-y orthogonal coordinate system. The straight line thus calculated extends along a plurality of the prospective contour point coordinates (xo,yo). It often occurs that bone edges or other image portions at which the image density changes sharply in the irradiation field B are also detected as prospective contour points. Therefore, as shown in FIG. 2, there is the risk that a straight line such as L will connect points where the image density changes sharply but which are not contour points with points actually on the contour of the irradiation field. However, if the aforesaid predetermined number Q is made substantially large (for example, 20 or larger), the straight line L is not obtained. Instead only straight lines representing the contour of the irradiation field are obtained.

Figure 7:
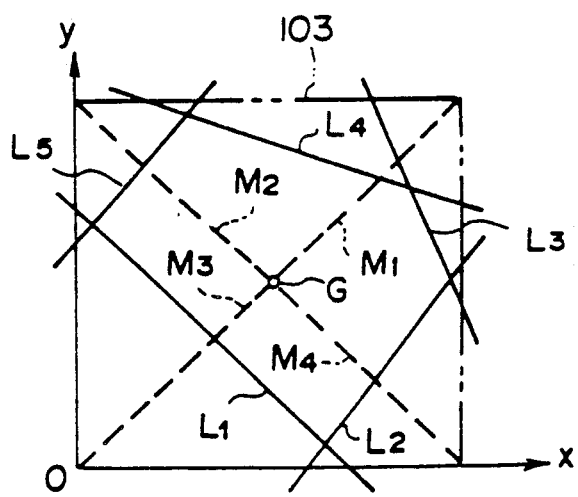
FIG. 7 is an explanatory view showing a method for extracting a region surrounded by straight lines which connect prospective contour points of an irradiation field.

In cases where the prospective contour points are distributed as shown in FIG. 2, straight lines as shown in FIG. 7 are obtained. The operating section 225 then detects the region surrounded by a plurality of straight lines L1, L2, L3, ..., Ln obtained in this manner, and recognizes said region as the irradiation field B. Specifically, for example, the region is recognized in the manner described below. The operating section 225 stores line segments M1, M2, M3, ..., Mm connecting the corners of the stimulable phosphor sheet 103 with the center point G (four line segments in cases where the stimulable phosphor sheet 103 is rectangular), and detects whether or not each of the line segments M1 to Mm intersects with each of the straight lines L1 to Ln. In cases where an intersection is present, the operating section 225 divides the stimulable phosphor sheet 103 into two regions: one including the corner of the stimulable phosphor sheet 103 to which the line segment is connected and delineated by the straight line and the other including the remainder of the stimulable phosphor sheet. The operating section 225 then discards the region including the corner. This operation is carried out for all of the straight lines L1 to Ln and the line segments M1 to Mm, and the region surrounded by the straight lines L1 to Ln is not discarded. The region thus obtained is recognized as the irradiation field B.

The operating section 225 sends a signal St representing the shape and location of the irradiation field B recognized in the manner described above to the signal extracting section 350 in the final read-out control circuit 314. The signal extracting section 350 extracts the image signal components corresponding to the region, which the signal St represents, from the preliminary read-out image signal Sp, and sends the preliminary read-out image signal Sp' comprising the extracted image signal components to the histogram analysis section 351. Therefore, the histogram analysis section 351 carries out an analysis of the histogram of only those image signal components representing the region of the stimulable phosphor sheet 103 that was actually exposed to radiation, and the aforesaid setting values (a), (b) and (c) are made suitable for the actual image input information.

In the aforesaid embodiment, differentiation processing is started on image signal components representing image information stored at positions neighboring the center point O of the stimulable phosphor sheet 103 in the region inside of the irradiation field B. However, differentiation processing may be started on image signal components representing image information stored at any position as long as the starting point lies on the stimulable phosphor sheet 103. For example, in cases where the irradiation field is limited to a very small area, the center point of the stimulable phosphor sheet may be present in the region outside of the irradiation field. In such cases, differentiation processing may be started on image signal components representing image information present at positions of the stimulable phosphor sheet 103 which lie in the region inside of the irradiation field, for example, a position at which the density level is the highest among density levels on the stimulable phosphor sheet, a position at which the center of gravity of the density is located, or a position at which the center of gravity in the region on a high density side is located when the image density levels are converted into the two-valued system.

Figure 8:
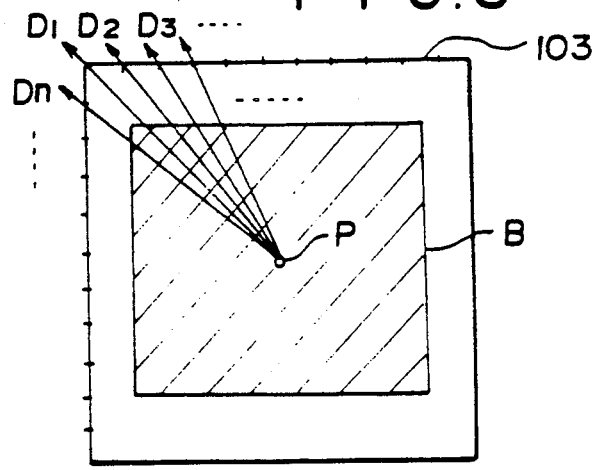
FIGS. 8, 9, 10, 11 and 12 are explanatory views showing examples of how the differentiation processing can be carried out in the first method for judging the correctness or incorrectness of a prospective contour point of an irradiation field in accordance with the present invention.

Also, directions D1 through Dn of differentiation processing need not necessarily be selected at equal angle intervals. For example, as shown in FIG. 8, a plurality of points which lie at equal distance intervals along edge portions of the stimulable phosphor sheet 103 may be selected, and directions D1 through Dn from a point P inside of the irradiation field B toward the plurality of said points may be selected as the directions of differentiation processing.

Figure 9:
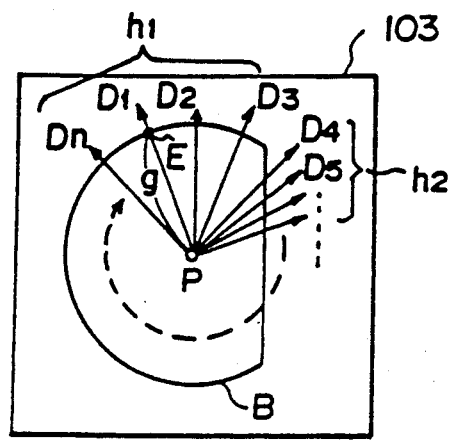

Furthermore, as shown in FIG. 9, the directions D of differentiation processing may have larger intervals between them in a region where the distance g between a point P inside of the irradiation field B and a prospective contour point E does not change very much, i.e. in the region corresponding to a region h1. In a region where the distance g changes markedly, i.e. in the region corresponding to a range h2, the directions D of differentiation processing may have smaller intervals between them.

A judgment standard different from Formula (1) may be utilized to judge whether a prospective contour point is or is not correct on the basis of the relationship between the distance from the prospective contour point, which is to be subjected to judgment, to a predetermined point in a region inside of an image and the distances from different prospective contour points to the predetermined point. For example, in cases where it is known in advance that the shape of the irradiation field B is rectangular as shown in FIG. 14, the correctness or incorrectness judging section 224 may investigate whether a prospective contour point Em different from prospective contour points at extreme portions of each side of the irradiation field B satisfies or does not satisfy the relationship expressed as $$l \leq \frac{l_1 + l_2}{2} \cdot \cos\frac{2\pi}{n} \quad (2)$$

When the prospective contour point Em does not satisfy Formula (2), it can be judged to be incorrect. This is because, if the prospective contour point Em is correct, it is not located closer to an edge of the stimulable phosphor sheet 103 than a straight line connecting prospective contour points Em+1 and Em−1, which are present on both sides of the prospective contour point Em.

Also, in cases where the shape of the irradiation field B is circular as shown in FIG. 15, the correctness or incorrectness judging section 224 may investigate whether a prospective contour point Em, which is to be subjected to judgment, satisfies or does not satisfy the relationship expressed as $$|l - \bar{l}| < \alpha$$

where l denotes the distance from the prospective contour point Em to the center point O of the irradiation field B, $\bar{l}$ denotes the mean value of the distances from all of the other prospective contour points to the center point O of the irradiation field B, and α denotes a predetermined threshold value. When the prospective contour point Em does not satisfy the relationship, i.e. when the distance l is much different than the distances from the other prospective contour points to the center point O of the irradiation field B, the prospective contour point Em can be judged to be incorrect.

Alternatively, in cases where the irradiation field B has the shape shown in FIG. 15, the correctness or incorrectness judging section 224 may investigate whether the prospective contour point Em, which is to be subjected to judgment, satisfies or does not satisfy the relationship expressed as $$|l - (l_1 + l_2)/2| < \beta$$

where l denotes the distance from the prospective contour point Em to the center point O of the irradiation field B, denotes the distance from a prospective contour point Em+1 to the center point O of the irradiation field B, l2 denotes the distance from a prospective contour point Em−1 to the center point O of the irradiation field B, said prospective contour points Em+1 and Em−1 being present on both sides of the prospective contour point Em, and β denotes a predetermined threshold value. When the prospective contour point Em does not satisfy the relationship, i.e. when the distance l is much different than the mean value of the distances l1 and l2, the prospective contour point Em can be judged to be incorrect.

Furthermore, in the first method for judging the correctness or incorrectness of a prospective contour point of an irradiation field in accordance with the present invention, distances between detected prospective contour points may be utilized as the judgment standard. For example, in cases where the shape of the irradiation field B is circular as shown in FIG. 16, the correctness or incorrectness judging section 224 may investigate whether a prospective contour point Em, which is to be subjected to judgment, satisfies or does not satisfy the relationship expressed as $$(l_3 + l_4)/2 < \gamma$$

where l3 denotes the distance from the prospective contour point Em to a prospective contour point Em+1, l4 denotes the distance from the prospective contour point Em to a prospective contour point Em−1, said prospective contour points Em+1 and Em−1 being present on both sides of the prospective contour point Em, and γ denotes a predetermined threshold value. When the prospective contour point Em does not satisfy the relationship, i.e. when the mean value of the distances l3 and l4 is very large, the prospective contour point Em can be judged to be incorrect.

Moreover, in the first method for judging the correctness or incorrectness of a prospective contour point of an irradiation field in accordance with the present invention, the angle between two straight lines, each line connecting a prospective contour point, which is to be subjected to judgment, to one of two different prospective contour points, may be utilized as the judgment standard. For example, in cases where the shape of the irradiation field B is circular as shown in FIG. 17, straight lines connecting a prospective contour point Em, which is to be subjected to judgment, with prospective contour points Em+1 and Em−1, which are present on both sides of the prospective contour point Em, are denoted by J1 and J2. The correctness or incorrectness judging section 224 investigates whether the prospective contour point Em satisfies or does not satisfy the relationship expressed as $$\theta > \Phi$$

where $\theta$ denotes the angle between the straight lines J1 and J2, and $\Phi$ denotes a predetermined threshold value. When the prospective contour point Em does not satisfy the relationship, i.e. when the angle $\theta$ is very small, the prospective contour point Em can be judged to be incorrect. Alternatively, the correctness or incorrectness judging section 224 may calculate such angles for all of the detected prospective contour points, and may investigate whether the prospective contour point Em satisfies or does not satisfy the relationship expressed as $$|1-\bar{1}| < \delta$$

where $\bar{1}$ denotes the mean value of the angles, and $\delta$ denotes a predetermined threshold value. When the prospective contour point Em does not satisfy the relationship, i.e. when the angle $\theta$ is much different than the mean value, the prospective contour point Em can be judged to be incorrect.

Figure 18:
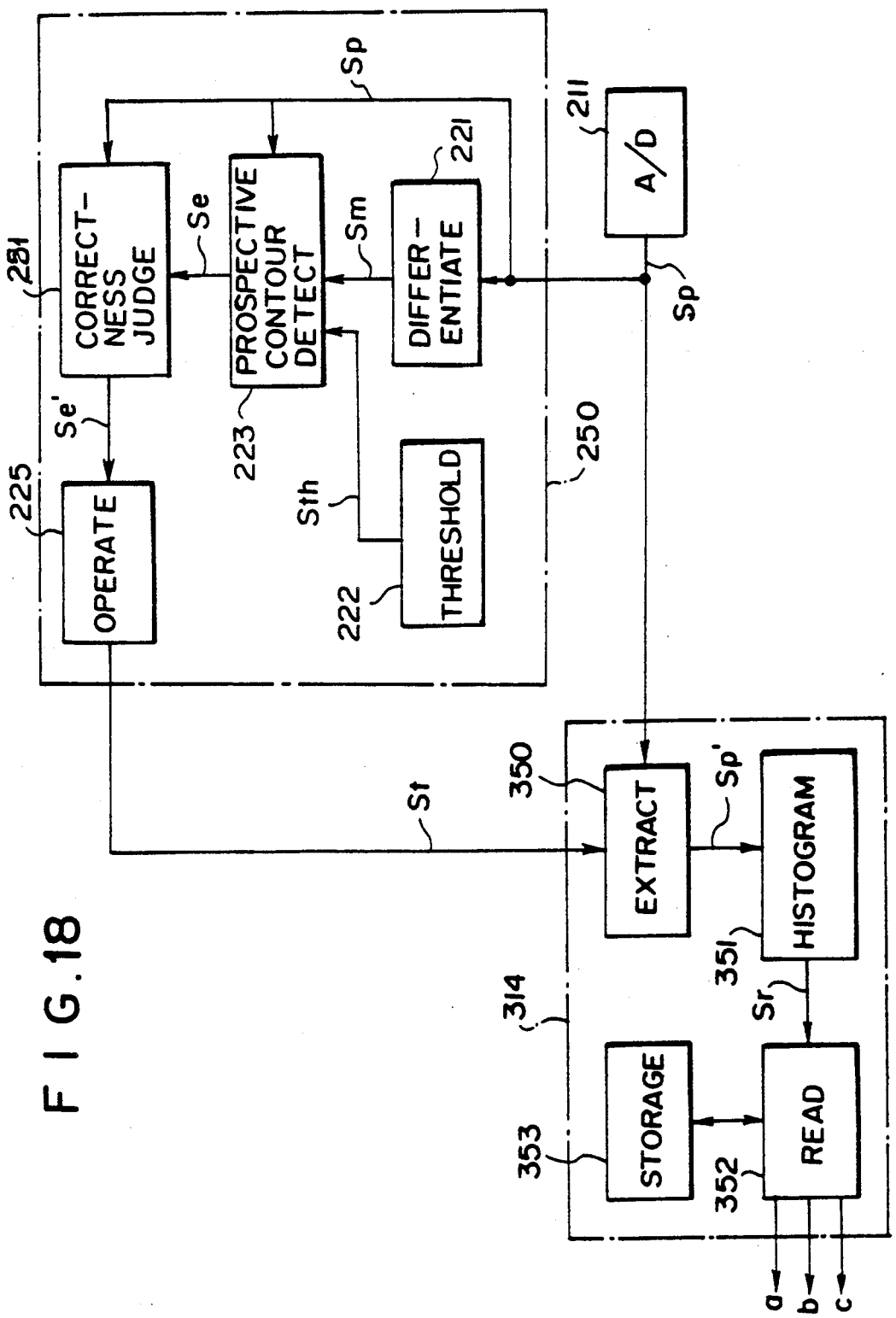
FIG. 18 is a block diagram showing part of the radiation image recording and reproducing system shown in FIG. 1, wherein an embodiment of the second method for judging the correctness or incorrectness of a prospective contour point of an irradiation field in accordance with the present invention is employed.

An embodiment of the second method for judging the correctness or incorrectness of a prospective contour point of an irradiation field in accordance with the present invention, which improves the accuracy of judgment, will hereinbelow be described with reference to FIG. 18. FIG. 18 shows an irradiation field recognizing circuit 250 which is used in the same manner as the irradiation field recognizing circuit 220 shown in FIG. 5. In FIG. 18, similar elements are numbered with the same reference numerals with respect to FIG. 5. In the irradiation field recognizing circuit 250, the signal Se which represents the picture element positions of prospective contour points and which is generated by the prospective contour point signal detecting section 223 is fed into a correctness or incorrectness judging section 251. The correctness or incorrectness judging section 251 also receives the preliminary read-out image signal Sp. For this embodiment, the shape of the irradiation field B is rectangular as shown in FIG. 14. The correctness or incorrectness judging section 251 utilizes Formula (2) as the judgment standard, and investigates whether a prospective contour point Em satisfies or does not satisfy Formula (2). When the prospective contour point Em does not satisfy Formula (2), the correctness or incorrectness judging section 251 judges that the prospective contour point Em is located closer to the edge of the stimulable phosphor sheet 103 than a line connecting prospective contour points Em+1 and Em−1, which are present on both sides of the prospective contour point Em. With reference to FIG. 19, in cases where the prospective contour point Em has been judged to be located closer to the edge of the stimulable phosphor sheet 103 than the straight line connecting the prospective contour points Em+1 and Em−1, the correctness or incorrectness judging section 251 finds a point Em′, which is assumed to be present on the contour of the irradiation field B, on the basis of the prospective contour points Em+1 and Em−1. In this embodiment, a point which is present on a straight line connecting the prospective contour point Em with the center point O of the stimulable phosphor sheet 103 and which is spaced at a distance expressed as $$l' = \frac{l_1 + l_2}{2} \cdot \cos \frac{2\pi}{n}$$

from the center point O is employed as the point Em′.

Thereafter, from the preliminary read-out image signal Sp, the correctness or incorrectness judging section 251 calculates the mean image density D in the region between the point Em′ and the originally detected prospective contour point Em. If the mean image density D is lower than a predetermined threshold value, the correctness or incorrectness judging section 251 judges that the prospective contour point Em is incorrect. Specifically, if the prospective contour point Em is present closer to the edge of the stimulable phosphor sheet 103 than the straight line connecting the prospective contour points Em+1 and Em−1, the region between the prospective contour point Em and the point Em′ lies outside of the irradiation field B. The image density is generally low in such a region. Therefore, judgment can be made as described above. In cases where the prospective contour point Em is judged to be present in the region outside of the irradiation field B, the correctness or incorrectness judging section 251 cancels the prospective contour point Em, or employs the point Em′ as a correct prospective contour point, instead of the prospective contour point Em.

The signal Se′ representing the picture element positions of the prospective contour points, which have been judged to be correct, is fed into the operating section 225. Based on the signal Se′, the contour of the irradiation field B is detected in the same manner as described above.

The step of judging, based on the mean image density, whether a detected prospective contour point is or is not present in the region outside of the irradiation field B may be carried out in cases where correctness or incorrectness of a prospective contour point is judged with a different judgment standard as well as in cases where judgment is made by using Formula (2) as the judgment standard.

Figure 10:
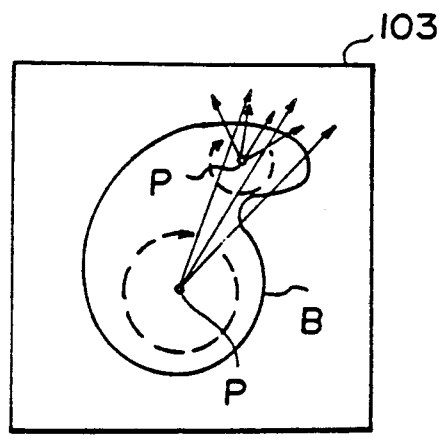
Figure 11:
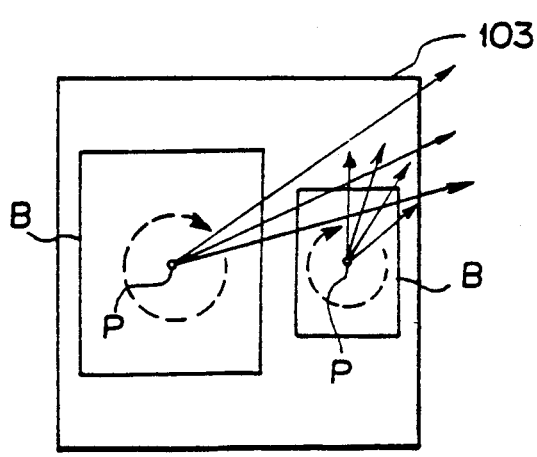
Figure 12:
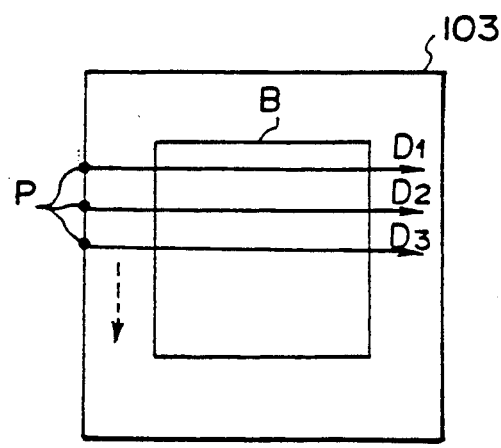

In cases where an irradiation field B having the shape shown in FIG. 2 is to be recognized, a single prospective contour point on the contour of the irradiation field is generally detected when differentiation processing is carried out along a single line. On the other hand, in cases where an irradiation field B having a shape shown in FIG. 10 or FIG. 11 is to be recognized, a plurality of prospective contour points on the contour of the irradiation field may be detected for a single direction of differentiation processing. In such cases, when all of the points at which the values of the aforesaid differences exceed the threshold value are detected as prospective contour points, the prospective contour points on the contour of the irradiation field can be detected completely, and an irradiation field B having a complicated shape can be recognized accurately. Also, as shown in FIG. 12, in cases where the shape of the irradiation field B is rectangular, differentiation processing may be carried out by shifting the position of the point P at which differentiation processing is started. In such cases, the signs (positive or negative) of the difference values are opposite for points on the contour of the irradiation field on the left-hand and right-hand sides of the stimulable phosphor sheet 103. In any case, the absolute value of the difference and a threshold value may be compared with each other. The first and second methods for judging the correctness or incorrectness of a prospective contour point of an irradiation field in accordance with the present invention are applicable also to cases where prospective contour points are detected in this manner.

An embodiment of the third method for judging the correctness or incorrectness of a prospective contour point of an irradiation field in accordance with the present invention will be described hereinbelow with reference to FIG. 23. FIG. 23 shows an irradiation field recognizing circuit 220' which is used in the same manner as the irradiation field recognizing circuit 220 shown in FIG. 5. In FIG. 23, similar elements are numbered with the same reference numerals with respect to FIG. 5.

Figure 20:
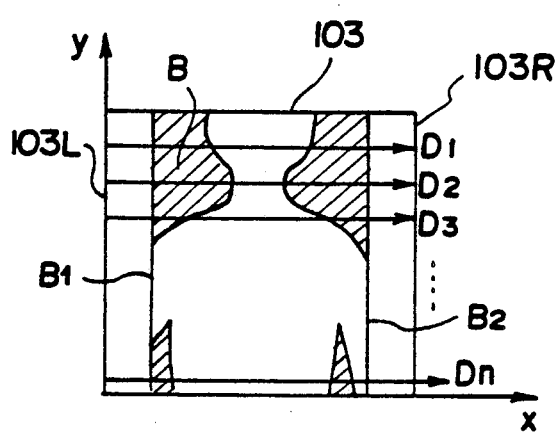
FIG. 20 is an explanatory view showing how the differentiation processing is carried out in the third method for judging the correctness or incorrectness of a prospective contour point of an irradiation field in accordance with the present invention.

With reference to FIG. 23, an irradiation field recognizing circuit 200' is composed of a differentiation processing section 221', a threshold value adjusting section 222', a prospective contour point signal detecting section 223', a correctness or incorrectness judging section 224', and an operating section 225'. The preliminary read out image signal Sp is fed into the differentiation processing section 221' and the prospective contour point signal detecting section 223'. The differentiation processing section 221' differentiates the preliminary read-out image signal Sp, which has been digitized, along a single line D1, then along lines D2, D3, ..., Dn shown in FIG. 20. In this embodiment, it is known in advance that the irradiation field B has a rectangular shape on a stimulable phosphor sheet 103 as shown in FIG. 20. The lines D1, D2, D3, ..., Dn intersect the portions B1 and B2 of the contour of the irradiation field B at right angles. The contour portions B1 and B2 are spaced at equal distances from a left edge 103L and a right edge 103R of the stimulable phosphor sheet 103, respectively. Differentiation processing may be of the one-dimensional type of first or higher order, or may be of the two-dimensional type of first or higher order. In cases where the image is discretely sampled, differentiation is equivalent to the calculation of the difference between neighboring image signal components. In this embodiment, the difference between neighboring image signal components is calculated. Differentiation processing is described in detail in U.S. patent application Ser. No. 760,862.

Figure 22A:
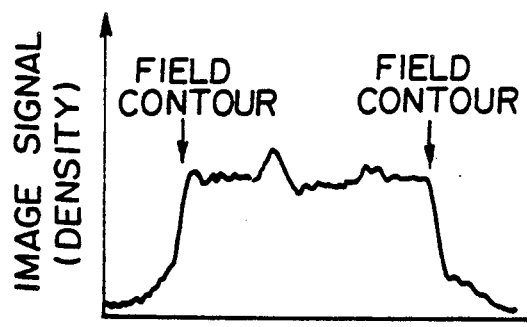
FIG. 22A is a graph showing the distribution of image signal components in the third method for judging the correctness or incorrectness of a prospective contour point of an irradiation field in accordance with the present invention.
Figure 22B:
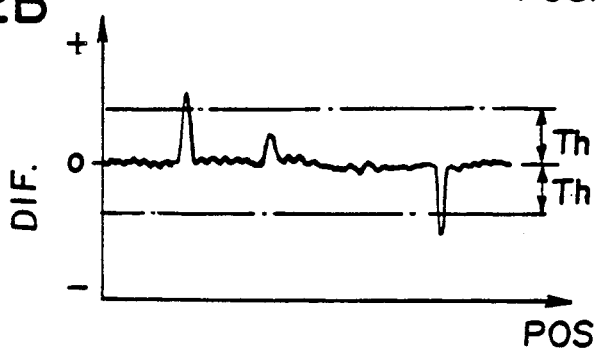
FIG. 22B is a graph showing the distribution of the difference values calculated from neighboring image signal components in the third method for judging the correctness or incorrectness of a prospective contour point of an irradiation field in accordance with the present invention.
Figure 24A:
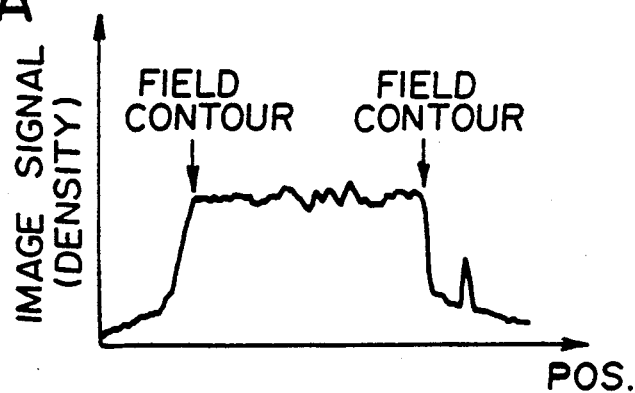
FIG. 24A is a graph showing a different example of the distribution of image signal components in the third method for judging the correctness or incorrectness of a prospective contour point of an irradiation field in accordance with the present invention.
Figure 24B:
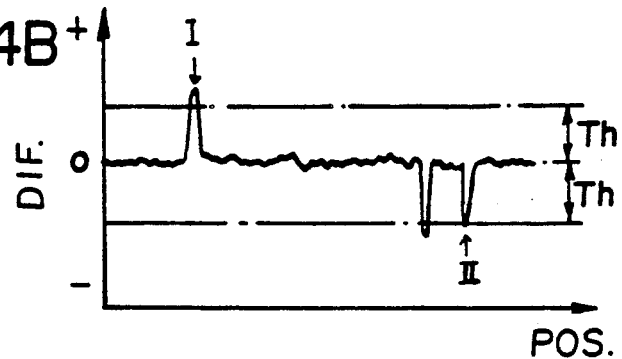
FIG. 24B is a graph showing a different example of the distribution of difference values calculated from neighboring image signal components in the third method for judging the correctness or incorrectness of a prospective contour point of an irradiation field in accordance with the present invention.
Figure 25A:
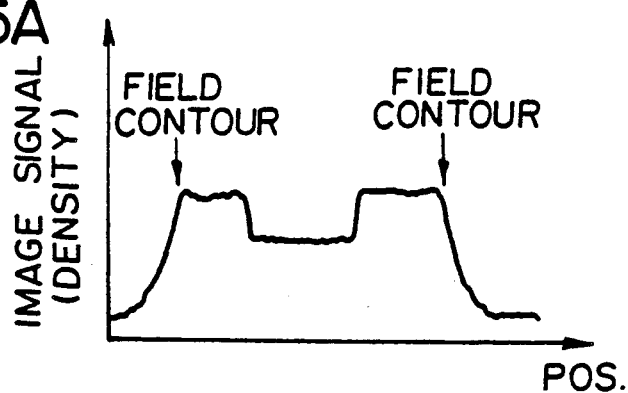
FIG. 25A is a graph showing a further example of the distribution of image signal components in the third method for judging the correctness or incorrectness of a prospective contour point of an irradiation field in accordance with the present invention.
Figure 25B:
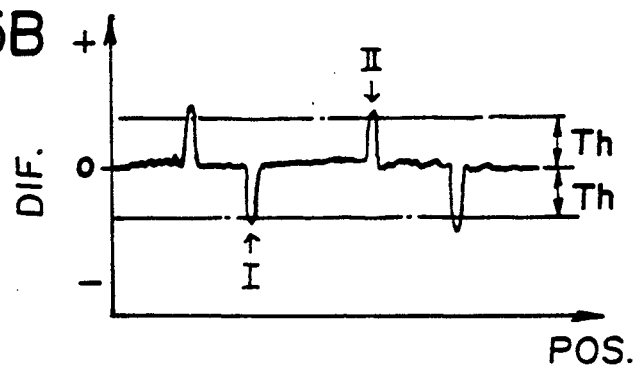
FIG. 25B is a graph showing a further example of the distribution of difference values calculated from neighboring image signal components in the third method for judging the correctness or incorrectness of a prospective contour point of an irradiation field in accordance with the present invention.

A signal Sm representing the differences obtained by differentiation processing is fed into the prospective contour point signal detecting section 223'. Based on the signal Sm representing the differences and a signal Sth which is received from the threshold value adjusting section 222' and which represents a threshold value Th, the prospective contour point signal detecting section 223' detects prospective contour points which are considered to be present on the contour portions B1 and B2 of the irradiation field B on the stimulable phosphor sheet 103. Specifically, the levels of the image signal components of the preliminary read-out image signal Sp for the region inside of the irradiation field B are distinctly higher than those for the region outside of the irradiation field B. Therefore, the values of the image signal components of the preliminary read-out image signal Sp along a certain direction Di are distributed as shown in FIG. 22A. Accordingly, as shown in FIG. 22B, the values of the aforesaid differences change markedly at the edge of an irradiation field. The prospective contour point signal detecting section 223' detects two points, at each of which the absolute value of the difference exceeds the threshold value Th, as prospective contour points. In cases where energy from scattered radiation which was stored in a region outside of the irradiation field B is detected during a preliminary read out, the image signal components of the preliminary read-out image signal Sp along the line Di are often distributed as shown in, for example, FIG. 24A and, as a result, the differences between neighboring image signal components are distributed as shown in FIG. 24B. Also, in cases where a radiation image including a bone image portion has been recorded on a stimulable phosphor sheet 103, the image signal components of the preliminary read-out image signal Sp along a line Di extending across the image of the edge of the bone are often distributed as shown in, for example, FIG. 25A and, as a result, the differences between neighboring image signal components are distributed as shown in FIG. 25B. In such cases, three or more points, at which the absolute values of the differences exceed the threshold value Th, are often detected. Therefore, in such cases, two prospective contour points are detected for a single line Di by, for example, selecting two points at which the absolute values of the differences are the largest and next largest.

Thereafter, the prospective contour point signal detecting section 223' extracts image signal components at the two prospective contour points, which have been detected in the manner described above, from the preliminary read-out image signal Sp. The prospective contour point signal detecting section 223' finds the positions of the picture elements respectively corresponding to the extracted image signal components, and feeds a signal Se representing the positions of the picture elements into the correctness or incorrectness judging section 224'. Most of the image signal components extracted from the preliminary read-out image signal Sp constitute an image signal, which represents the contour portions B1 and B2 of the irradiation field B on the stimulable phosphor sheet 103 as shown in FIG. 20. In this embodiment, as shown in FIG. 20, the positions of the picture elements are expressed on an x-y orthogonal coordinate system on the stimulable phosphor sheet 103.

Figure 26:
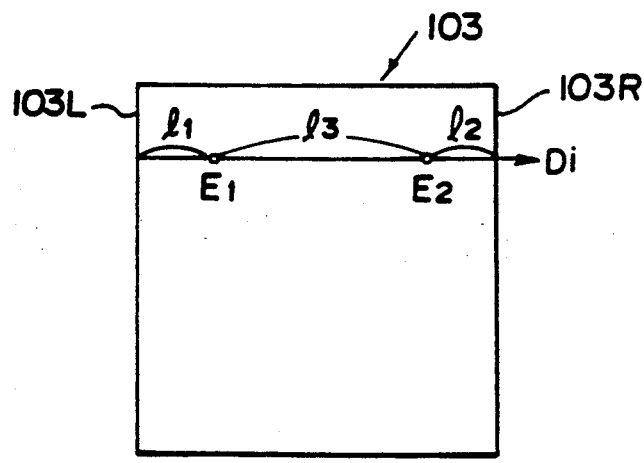
FIG. 26 is an explanatory view showing the third method for judging the correctness or incorrectness of a prospective contour point of an irradiation field in accordance with the present invention.

The correctness or incorrectness judging section 224' judges whether the prospective contour points at the positions of the picture elements which are represented by the signal Se are or are not truly present at contour portions B1 and B2 of the irradiation field. Specifically, with reference to FIG. 26, E1 and E2 denote the two prospective contour points detected on each line. The correctness or incorrectness judging section 224' calculates the distance l1 from the left edge 103L of the stimulable phosphor sheet 103 to the left prospective contour point E1, the distance l2 from the right edge 103R of the stimulable phosphor sheet 103 to the right prospective contour point E2, and the distance l3 between the prospective contour points E1 and E2. Thereafter, the correctness or incorrectness judging section 224' investigates whether the relationships expressed as $$|l_1 - l_2| < \alpha \tag{3}$$

$$l_3 > \beta \tag{4}$$

where α and β each denote a predetermined threshold value, are or are not satisfied. The difference between the distances l1 and l2 should be small. However, if points I and II shown in FIG. 24B were detected as the prospective contour points E1 and E2, the difference between the distances l1 and l2 is large, and Formula (3) is not satisfied. Also, the prospective contour points E1 and E2 must be spaced a substantial distance from each other. However, if points I and II shown in FIG. 25B were detected as the prospective contour points E1 and E2, because the points I and II are somewhat close to each other, Formula (4) is not satisfied. Accordingly, when at least one of Formulas (3) and (4) is not satisfied, the correctness or incorrectness judging section 224' judges that the prospective contour points E1 and E2 are incorrect, and eliminates the information about the prospective contour points E1 and E2 from the picture element position signal Se. On the other hand, when both Formulas (3) an (4) are satisfied, the information about the prospective contour points E1 and E2 is not eliminated from the picture element position signal Se. The correctness or incorrectness judging section 224' carries out the aforesaid judgment and eliminating processes, when necessary, for all of the detected prospective contour points, and feeds a processed picture element position signal Se' to the operating section 225'.

In this embodiment, when the prospective contour points E1 and E2 are judged to be incorrect, they are canceled. Alternatively, new prospective contour points may be derived from other prospective contour points.

Figure 27:
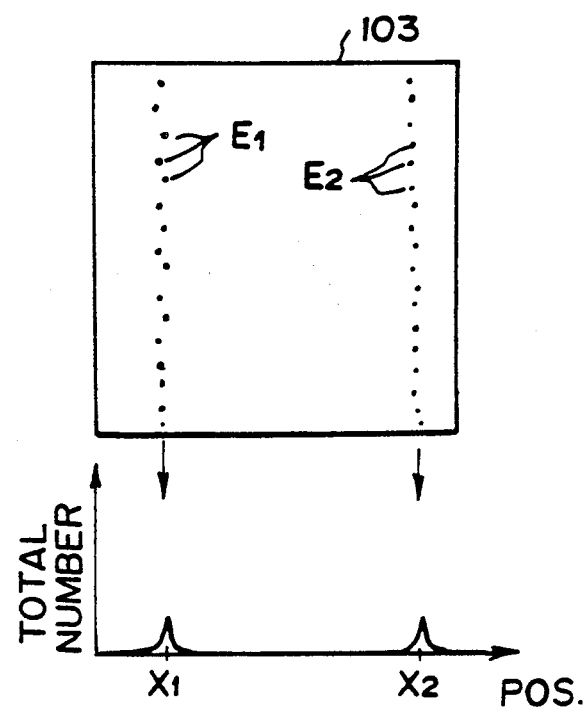
FIG. 27 is an explanatory view showing a method for extracting a region surrounded by straight lines which connect prospective contour points of an irradiation field.

Based on the signal Se' representing the picture element positions of correct prospective contour points, the operating section 225' detects two straight lines connecting the correct prospective contour points. The two straight lines may be recognized as portions of the contour of the irradiation field B. The lines connecting the prospective contour points can be found by using one of several methods, for example, a method wherein prospective contour points remaining after a smoothing process has been carried out are connected together. It is also possible to employ a method wherein, as shown in FIG. 27, the number of the prospective contour points E1, E1, ... and the number of the prospective contour points E2, E2, ... are counted along the vertical lines (i.e. the total number of said points along each of two lines parallel to the vertical axis are counted). The numbers of said points occuring at respective positions of the horizontal axis are then counted and graphed as shown in FIG. 27, and two straight lines which pass through positions x1 and x2 are detected. The operating section 225' sends the signal St representing the size and location of the irradiation field B recognized in the manner described above to the signal extracting section 350 of the final read-out control circuit 314. The signal extracting section 350 extracts the image signal components corresponding to the image information stored in the region, which the signal St represents, from the preliminary read out image signal Sp, and sends the preliminary read-out image signal Sp' comprising the extracted image signal components to the histogram analysis section 351. Therefore, an analysis of a histogram of the image signal is carried out in the histogram analysis section 351 only for the region on the stimulable phosphor sheet 103 that was actually exposed to radiation, and the aforesaid setting values (a), (b) and (c) are adjusted to be suitable for the actual image input information.

Figure 21:
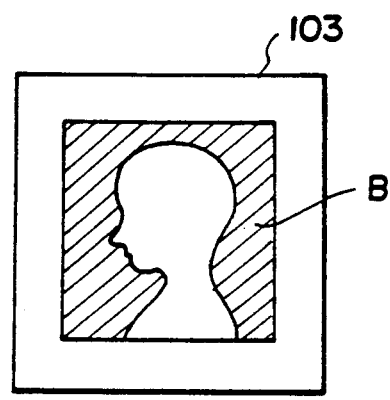
FIG. 21 is an explanatory view showing the state of a radiation image stored on a stimulable phosphor sheet in the third method for judging the correctness or incorrectness of a prospective contour point of an irradiation field in accordance with the present invention.

In the embodiment shown in FIG. 23, differentiation processing is carried out only along lines parallel to the x axis as shown in FIG. 20. In cases where, as shown in FIG. 21, the irradiation field B has a rectangular shape, prospective contour points may also be detected by carrying out differentiation processing along several lines parallel to the y axis. Two straight lines which connect the detected prospective contour points and which are parallel to the x axis may then be detected, and a rectangular region surrounded by the detected straight lines parallel to the x axis and the straight lines which have been detected in the manner mentioned above and which are parallel to the y axis may be recognized as enclosing the irradiation field B.

In general, the preliminary read out described above is carried out for picture elements which are larger than the picture elements of the final read out. In the aforesaid embodiments of the first, second and third methods for judging the correctness or incorrectness of a prospective contour point of an irradiation field in accordance with the present invention, differentiation processing may be carried out on image signal components obtained by such a comparatively rough read-out operation. Alternatively, the image signal components may be interpolated to obtain finer image signal components corresponding to small picture elements giving the image a finer resolution, and differentiation processing may be carried out on this grater number of image signal components. Also, differentiation processing may be conducted for image signal components obtained by averaging the values of the image signal components detected at a plurality of picture elements.

In the radiation image recording and reproducing system shown in FIG. 1, the preliminary read-out section and the final read-out section are disposed independently. However, as disclosed in, for example, U.S. Pat. No. 4,527,060, a single read-out system may be used for the preliminary read out and the final read out. In this case, after the preliminary read out is finished, the stimulable phosphor sheet is returned to the read-out system by a sheet conveyance means and then the final read out is carried out. In the preliminary read-out step, the energy level of the stimulating rays is adjusted by a stimulating ray energy adjusting means so that it is lower than the energy level of the stimulating rays used in the final read out. The first, second and third methods for judging the correctness or incorrectness of a prospective contour point of an irradiation field in accordance with the present invention are also applicable to such cases.

Also, in the first, second and third methods for judging the correctness or incorrectness of a prospective contour point of an irradiation field in accordance with the present invention, instead of recognizing the shape and location of an irradiation field based on the preliminary read-out image signal, a prospective contour point of an irradiation field may be recognized by utilizing the final read-out image signal or an image signal, which is obtained by directly carrying out an image read-out step corresponding to final read out. In this case, information on the recognized irradiation field can be utilized for, for example, adjusting the image processing condition setting value (c).

Furthermore, the first, second and third methods for judging the correctness or incorrectness of a prospective contour point of an irradiation field in accordance with the present invention are also applicable to cases where a radiation image is read out from a recording medium such as silver halide photographic film on which an X-ray image has been recorded.

I claim:

1. In a method for detecting an image signal representing a radiation image from a recording medium which has been exposed to radiation over a limited irradiation field in order to record a radiation image thereon, and detecting a prospective contour point, which is considered to be present on a contour of the irradiation field, from the image signal, a method for judging the correctness or incorrectness of a prospective contour point of an irradiation field which comprises the steps of:
  (i) judging whether a prospective contour point, which has been detected, satisfies or does not satisfy a predetermined judgement standard, wherein said judgement standard is the relationship between the distance from said detected prospective contour point to a predetermined point inside of the radiation image and distances from other prospective contour points to said predetermined point; and
  (ii) in cases where said detected prospective contour point does not satisfy the predetermined judgement standard, judging that said detected prospective contour point is incorrect and is not present on a portion of an irradiated field.

2. A method for judging correctness or incorrectness of a prospective contour point of an irradiation field as defined in claim 1 wherein said recording medium is a stimulable phosphor sheet on which a radiation image has been stored, and said image signal is detected by exposing said stimulable phosphor sheet to stimulating rays which cause it to emit light in proportion to the amount of energy stored thereon during exposure to radiation, and photoelectrically detecting the emitted light.

3. A method for judging the correctness or incorrectness of a prospective contour point of an irradiation field as defined in claim 1 wherein said image signal is obtained by a preliminary read out operation.

4. In a method for detecting an image signal representing a radiation image from a recording medium which has been exposed to radiation over a limited irradiation field in order to record a radiation image thereon, and detecting a prospective contour point, which is considered to be present on a contour of the irradiation field, from the image signal, a method for judging the correctness or incorrectness of a prospective contour point of an irradiation field which comprises the steps of:
  (i) judging whether a prospective contour point, which has been detected, satisfies or does not satisfy a predetermined judgement standard, wherein said judgement standard is the relationship between distances from said detected prospective contour point to other prospective contour points and a predetermined threshold value; and
  (ii) in cases where said detected prospective contour point does not satisfy the predetermined judgement standard, judging that said detected prospective contour point is incorrect and is not present on a portion of an irradiated field.

5. In a method for detecting an image signal representing a radiation image from a recording medium which has been exposed to radiation over a limited irradiation field in order to record a radiation image thereon, and detecting a prospective contour point, which is considered to be present on a contour of the irradiation field, from the image signal, a method for judging the correctness or incorrectness of a prospective contour point of an irradiation field, which comprises the steps of:
  (i) judging whether a prospective contour point, which has been detected, satisfies or does not satisfy a predetermined judgement standard, wherein said judgement standard is the relationship between an angle, which is formed between two straight lines, each of which connects said detected prospective contour point to one of two other prospective contour points, and a predetermined threshold value; and
  (ii) in cases where said detected prospective contour point does not satisfy the predetermined judgement standard, judging that said detected prospective contour point is incorrect and is not present on a portion of an irradiation field.

6. A method for judging the correctness or incorrectness of a prospective contour point of an irradiation field as defined in claim 5 wherein said recording medium is a stimulable phosphor sheet on which a radiation image has been stored, and said image signal is detected by exposing said stimulable phosphor sheet to stimulating rays which cause it to emit light in proportion to the amount of energy stored thereon during exposure to radiation, and photoelectrically detecting the emitted light.

7. A method for judging the correctness or incorrectness of a prospective contour point of an irradiation field as defined in claim 5 wherein said image signal is obtained by a preliminary read out operation.

8. In a method for detecting an image signal representing a radiation image from a recording medium which has been exposed to radiation over a limited irradiation field in order to record the radiation image thereon, and detecting a prospective contour point, which is considered to be present on a contour of the irradiation field, from the image signal, a method for judging the correctness or incorrectness of a prospective contour point of an irradiation field, which comprises the steps of:
  (i) investigating whether a prospective contour point, which has been detected, satisfies or does not satisfy a predetermined judgment standard,
  (ii) calculating the mean image density in the region extending from said detected prospective contour point to a point, which is assumed to be present on a contour of an irradiation field from the positions of other prospective contour points, and
  (iii) in cases where said detected prospective contour point does not satisfy the predetermined judgment standard and, at the same time, the mean image density is lower than a predetermined threshold value, judging that said detected prospective contour point is incorrect and is not present on the contour of the irradiation field.

9. A method for judging the correctness or incorrectness of a prospective contour point of an irradiation field as defined in claim 8 wherein said judgment standard is the relationship between the distances from said detected prospective contour point to other prospective contour points and a predetermined threshold value.

10. A method for judging the correctness or incorrectness of a prospective contour point of an irradiation field as defined in claim 8 wherein said recording medium is a stimulable phosphor sheet on which a radiation image has been stored, and said image signal is detected by exposing said stimulable phosphor sheet to stimulating rays which cause it to emit light in proportion to the amount of energy stored thereon during exposure to radiation, and photoelectrically detecting the emitted light.

11. A method for judging the correctness or incorrectness of a prospective contour point of an irradiation field as defined in claim 8 wherein said image signal is obtained by a preliminary read out operation.

12. In a method for detecting an image signal representing a radiation image from a recording medium which has been exposed to radiation over a limited irradiation field in order to record a radiation image thereon, and detecting a prospective contour point, which is considered to be present on a contour of the irradiation field, from the image signal,
   a method for judging the correctness or incorrectness of a prospective contour point of an irradiation field, which comprises the steps of:
   (i) judging whether a prospective contour point, which has been detected, satisfies or does not satisfy a predetermined judgement standard, wherein said judgement standard is the relationship between the distance from said detected prospective contour point to a predetermined point inside of the radiation image and distances from different prospective contour points to said predetermined point;
   (ii) calculating the mean image density in the region extending from said detected prospective contour point to a point which is assumed to be present on a contour of an irradiated field from the positions of other prospective contour points, and
   (iii) in cases where said detected prospective contour point does not satisfy the predetermined judgement standard and, at the same time, the mean image density is lower than a predetermined threshold value, judging that said detected prospective contour point is incorrect and is not present on the contour of the irradiation field.

13. A method for judging correctness or incorrectness of a prospective contour point of an irradiation field as defined in claim 12 wherein said recording medium is a stimulable phosphor sheet on which a radiation image has been stored, and said image signal is detected by exposing said stimulable phosphor sheet to stimulating rays which cause it to emit light in proportion to the amount of energy stored thereon during exposure to radiation, and photoelectrically detecting the emitted light.

14. A method for judging the correctness or incorrectness of a prospective contour point of an irradiation field as defined in claim 12 wherein said image signal is obtained by a preliminary read out operation.

15. In a method for detecting an image signal representing a radiation image from a recording medium which has been exposed to radiation over a limited irradiation field in order to record the radiation image thereon, and detecting a prospective contour point, which is considered to be present on a contour of the irradiation field, from the image signal,
   a method for judging the correctness or incorrectness of a prospective contour point of an irradiation field, which comprises the steps of:
   (i) judging whether a prospective contour point, which has been detected, satisfies or does not satisfy a predetermined judgment standard, wherein said judgement standard is the relationship between an angle, which is formed between two straight lines, each of which lines connects said detected prospective contour point to one of two other prospective contour points, and a predetermined threshold value;
   (ii) calculating the mean image density in the region extending from said detected prospective contour point to a point, which is assumed to be present on a contour of an irradiation field from the positions of other prospective contour points, and
   (iii) in cases where said detected prospective contour point does not satisfy the predetermined judgement standard and, at the same time, the mean image density is lower than a predetermined threshold value, judging that said detected prospective contour point is incorrect and is not present on the contour of the irradiation field.

16. In a method for detecting prospective contour points which comprises the steps of, in cases where, in order to record a radiation image thereon, a rectangular recording medium has been exposed to radiation over a limited irradiation field having a rectangular shape so that two portions of the contour of the irradiation field are approximately parallel to each other and spaced at approximately equal distances from two opposite sides of the recording medium:
   (i) detecting an image signal representing said radiation image from said recording medium,
   (ii) sampling and digitizing the image signal to obtain digital image signal components representing image information stored at respective positions on said recording medium,
   (iii) carrying out differentiation processing on the digital image signal components representing large information stored at positions of the recording medium located along a single line which intersects said two opposite sides of said recording medium at right angles, and
   (iv) based on differentiated values obtained from the differentiation processing, detecting two prospective contour points each of which is considered to be present at each of two said contour portions,
   a method for judging the correctness or incorrectness of a prospective contour point of an irradiation field, which comprises the steps of:
   (a) investigating whether the relationships expressed as $|l_1 - l_2| < \alpha, \ l_3 > \beta$ are or are not satisfied, where l1 denotes the distance from one of said two opposite sides of said recording medium to the detected prospective contour point, which is nearer to said one of said two opposite sides of said recording medium than the other of two said detected prospective contour points, l2 denotes the distance from the other of said two opposite sides of said recording medium to the detected prospective contour point, which is nearer to said other of said two opposite sides of said recording medium than the other of two said detected prospective contour points, l3 denotes the distance between two said detected prospective contour points, and $\alpha$ and $\beta$ each denote a predetermined threshold value, and (b) in cases where at least one of said relationships is not satisfied, judging that two said detected prospective contour points are incorrect and are not present on the contour of the irradiation field.

17. A method for judging the correctness or incorrectness of a prospective contour point of an irradiation field as defined in claim 16 wherein said recording medium is a stimulable phosphor sheet on which a radiation image has been stored, and said image signal is detected by exposing said stimulable phosphor sheet to stimulating rays which cause it to emit light in proportion to the amount of energy stored thereon during exposure to radiation, and photoelectrically detecting the emitted light.

18. A method for judging the correctness or incorrectness of a prospective contour point of an irradiation field as defined in claim 16 wherein said image signal is obtained by a preliminary read out operation.

* * * * *

UNITED STATES PATENT AND TRADEMARK OFFICE
CERTIFICATE OF CORRECTION

PATENT NO.   : 4,992,663
DATED        : February 12, 1991
INVENTOR(S)  : Hideya TAKEO It is certified that error appears in the above-identified patent and that said Letters Patent is hereby corrected as shown below:

On cover page of patent at item [30], Foreign Application Priority Data, now printed as Mar. 19, 1988 [JP] Japan .....63-66737
    Jul. 26, 1988 [JP] Japan .....63-186084 should be:

Mar. 19, 1988 [JP] Japan .....63-66737
    Mar. 19, 1988 [JP] Japan .....63-66738
    Jul. 26, 1988 [JP] Japan .....63-186084
    Jul. 26, 1988 [JP] Japan .....63-186085

Signed and Sealed this

Eighth Day of September, 1992

Attest:

DOUGLAS B. COMER

*Attesting Officer*  *Acting Commissioner of Patents and Trademarks*